(12) United States Patent
Okino

(10) Patent No.: US 10,080,221 B2
(45) Date of Patent: *Sep. 18, 2018

(54) RADIO COMMUNICATION SYSTEM, RADIO BASE STATION, AND COMMUNICATION CONTROL METHOD THAT CAN REDUCE AN INTER-BASE STATION INTERFERENCE BETWEEN DOWNLINK CONTROL CHANNELS

(71) Applicant: KYOCERA CORPORATION, Kyoto (JP)

(72) Inventor: Kenta Okino, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/663,281

(22) Filed: Jul. 28, 2017

(65) Prior Publication Data

US 2017/0332361 A1    Nov. 16, 2017

Related U.S. Application Data

(63) Continuation of application No. 13/639,807, filed as application No. PCT/JP2011/058637 on Apr. 5, 2011, now Pat. No. 9,736,827.

(30) Foreign Application Priority Data

Apr. 6, 2010 (JP) .................................. 2010-087686
Jun. 17, 2010 (JP) .................................. 2010-138802
(Continued)

(51) Int. Cl.
*H04W 4/00* (2018.01)
*H04W 72/04* (2009.01)
(Continued)

(52) U.S. Cl.
CPC ......... *H04W 72/042* (2013.01); *H04W 24/00* (2013.01); *H04W 52/244* (2013.01);
(Continued)

(58) Field of Classification Search
CPC . H04W 72/042; H04W 24/00; H04W 52/244; H04W 72/00; H04W 88/08; H04W 92/20
See application file for complete search history.

(56) References Cited

U.S. PATENT DOCUMENTS

2004/0127191 A1    7/2004  Matsunaga
2006/0251013 A1   11/2006  Roy et al.
(Continued)

FOREIGN PATENT DOCUMENTS

JP    2004-207839 A    7/2004
JP    2008-541565 A   11/2008
(Continued)

OTHER PUBLICATIONS

Qualcomm Inc.; Importance of Serving Cell Selection in Heterogeneous Networks; 3GPP TSG-RAN WG1 #60; R1-101506; Feb. 22-26, 2012; pp. 1-5; San Francisco, CA, USA.
(Continued)

*Primary Examiner* — Abdelnabi O Musa
(74) *Attorney, Agent, or Firm* — Studebaker & Brackett PC

(57) ABSTRACT

A picocell base station (PeNB) uses a downlink control channel, the frequency band of which overlaps with the frequency band of the downlink control channel used by a macrocell base station (MeNB), to transmit downlink control information for controlling radio communication with a radio terminal (PUE) connected to the picocell base station (PeNB). The picocell base station (PeNB) comprises an X2 interface communication unit (140) which uses inter-base station communication to transmit to the macrocell base
(Continued)

station (MeNB) usage control information for controlling the control channel usage that is the usage of a radio resource used as the downlink control channel by the macrocell base station (MeNB).

6 Claims, 17 Drawing Sheets

(30) Foreign Application Priority Data

Aug. 12, 2010 (JP) .................................. 2010-181165
Oct. 4, 2010 (JP) .................................. 2010-225266

(51) Int. Cl.
*H04W 24/00* (2009.01)
*H04W 52/24* (2009.01)
*H04W 88/08* (2009.01)
*H04W 92/20* (2009.01)
*H04W 72/00* (2009.01)

(52) U.S. Cl.
CPC ............ *H04W 72/00* (2013.01); *H04W 88/08* (2013.01); *H04W 92/20* (2013.01)

(56) References Cited

U.S. PATENT DOCUMENTS

| | | | |
|---|---|---|---|
| 2009/0129335 A1 | 5/2009 | Lee et al. | |
| 2009/0197631 A1 | 8/2009 | Palanki et al. | |
| 2009/0252077 A1 | 10/2009 | Khandekar et al. | |
| 2009/0264077 A1* | 10/2009 | Damnjanovic | H04W 52/244 |
| | | | 455/63.1 |
| 2010/0008317 A1 | 1/2010 | Bhattad et al. | |
| 2010/0054358 A1* | 3/2010 | Ko | H04B 7/0639 |
| | | | 375/267 |
| 2010/0203882 A1 | 8/2010 | Frenger et al. | |
| 2010/0227569 A1* | 9/2010 | Bala | H04L 5/0007 |
| | | | 455/73 |
| 2010/0302978 A1* | 12/2010 | Roh | H04B 7/024 |
| | | | 370/310 |
| 2011/0103241 A1 | 5/2011 | Cho et al. | |
| 2011/0201341 A1 | 8/2011 | Choudhury et al. | |
| 2011/0223929 A1* | 9/2011 | Boudreau | H04W 72/1231 |
| | | | 455/452.1 |
| 2011/0235601 A1 | 9/2011 | Yoo et al. | |
| 2012/0213189 A1 | 8/2012 | Choi et al. | |

FOREIGN PATENT DOCUMENTS

| | | |
|---|---|---|
| WO | 2008/135101 A1 | 11/2008 |
| WO | 2009/129413 A2 | 10/2009 |
| WO | 2010/011112 A2 | 1/2010 |
| WO | 2010/086734 A1 | 8/2010 |

OTHER PUBLICATIONS

International Search Report issued in PCT/JP2011/05863; dated Jul. 12, 2011.

Kyocera; Downlink Interference Coordination Assisted by Network between Home eNodeB and Macro eNodeB for LTE-Advanced; 3GPP TSG-RAN WG1 #59; R1-094778; Nov. 9-13, 2009; pp. 1-8; Jeju, Republic of Korea.

Japanese Office Action "Notification of Reason(s) for Refusal" dated Nov. 20, 2012, which corresponds to Japanese Patent Application No. 2012-509672 and is related to U.S. Appl. No. 13/639,807 with translation.

Japanese Office Action "Notification of Reasons for Refusal" dated Feb. 19, 2013, which corresponds to Japanese Patent Application No. 2012-509672 and is related to U.S. Appl. No. 13/639,807 with translation. Please note that 2nd cited reference JP2008-528214 is incorrectly written in this OA. The correct reference number is JP2008-541-541565.

The extended European search report issued by the European Patent Office dated May 12, 2016, which corresponds to European Patent Application No. 11765924.3-1854 and is related to U.S. Appl. No. 13/639,807.

3rd Generation Partnership Project; Technical Specification Group Radio Access Network; Evolved Universal Terrestrial Radio Access Network (E-UTRAN); X2 application protocol (X2AP), Release 8; 3GPP TS 36.423, V8.9.0; Mar. 2010; pp. 1-100; http://www.3gpp.org; 3GPP Organizational Partners.

* cited by examiner

FIG. 2
(a)
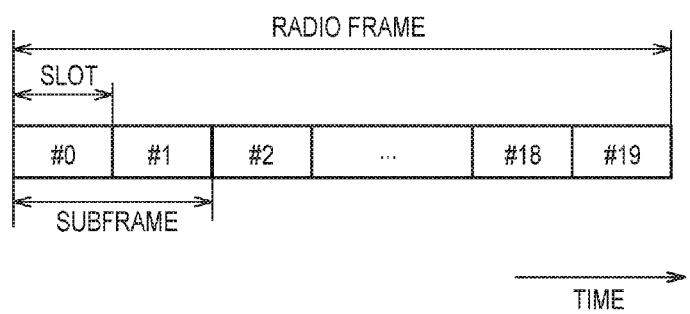
(b)
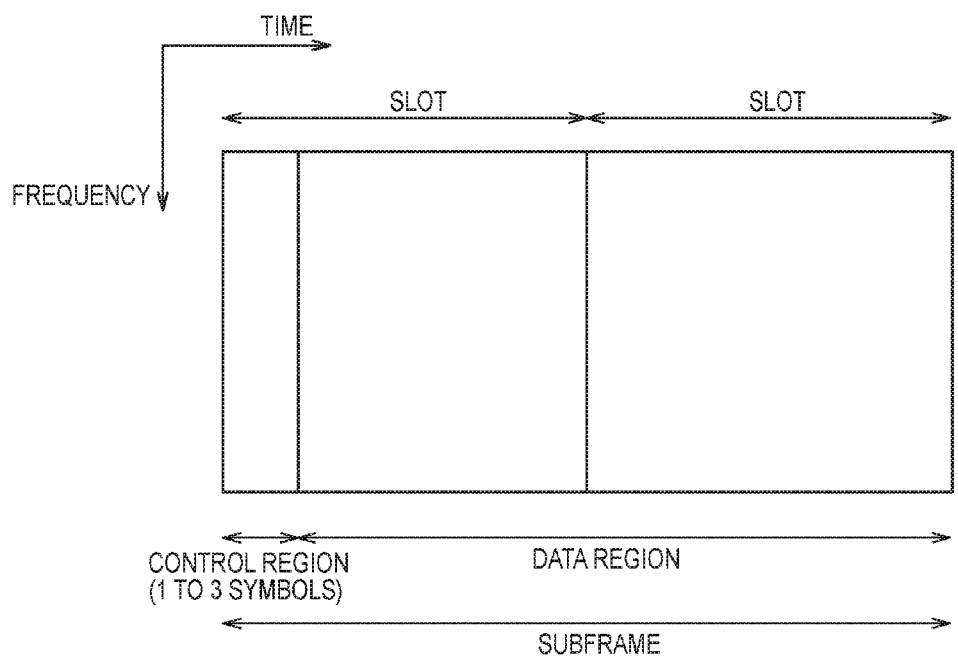

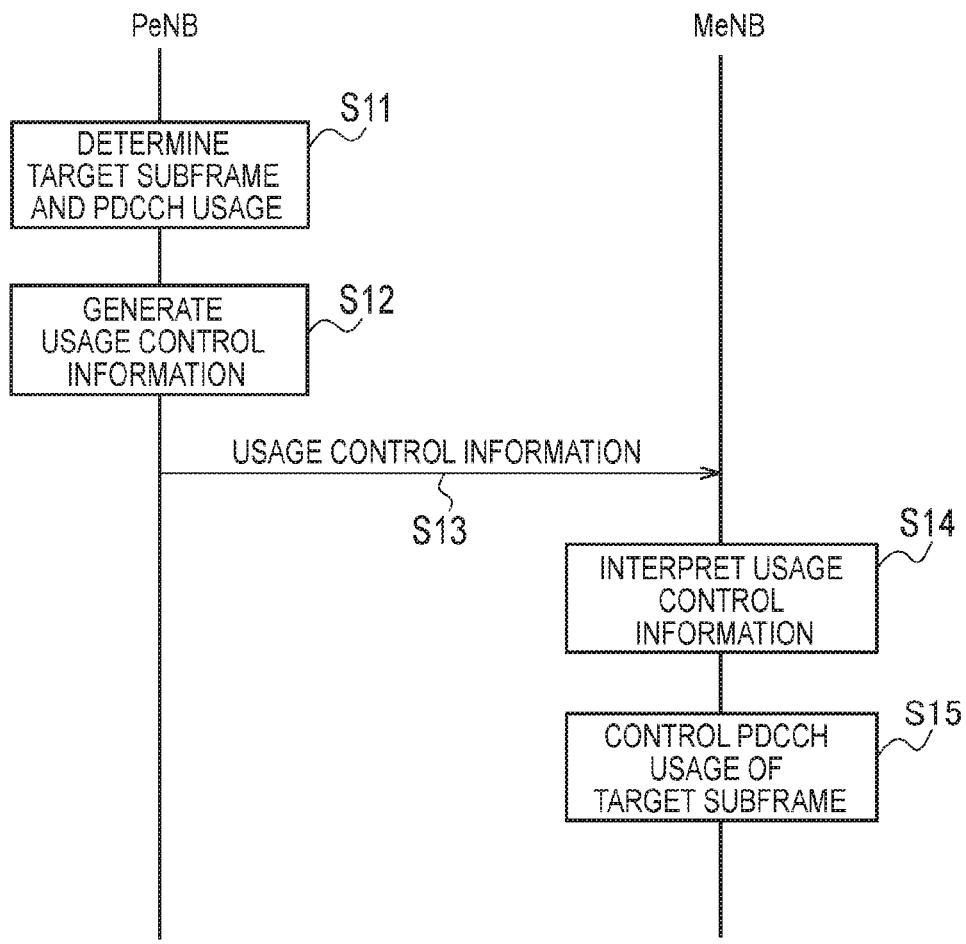

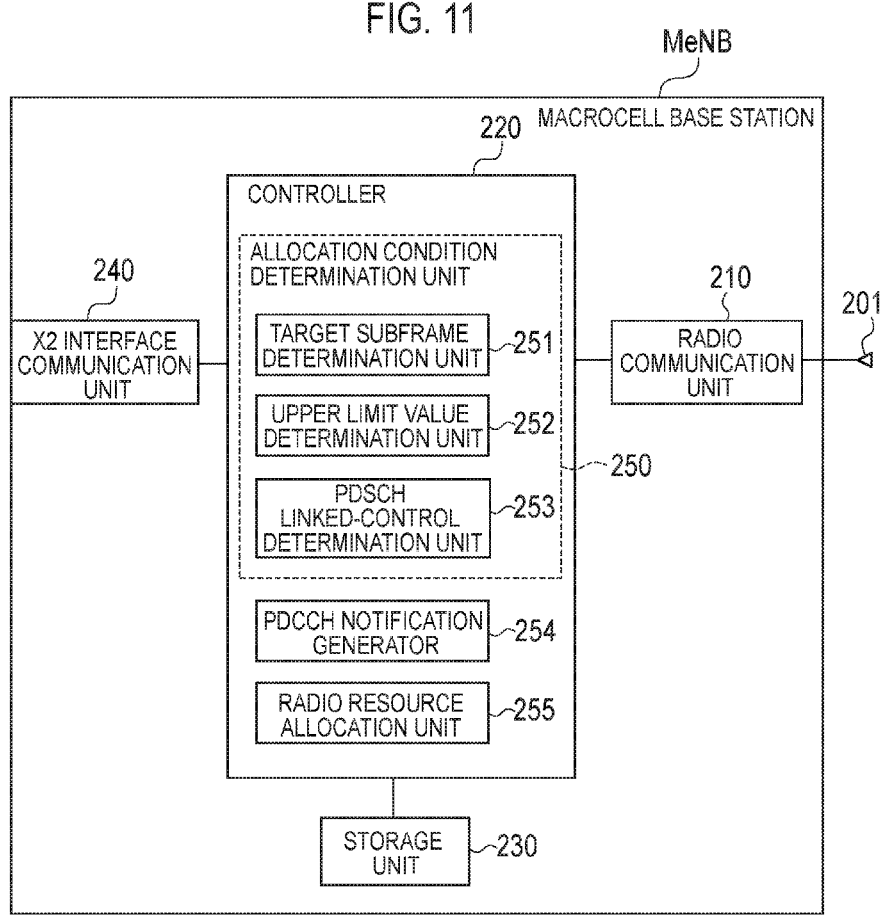
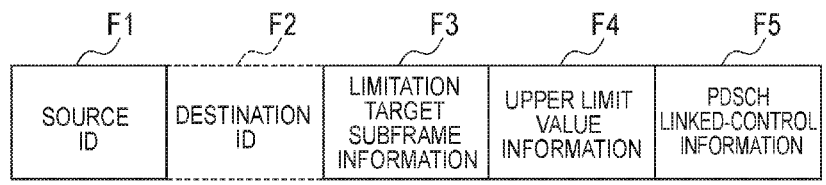

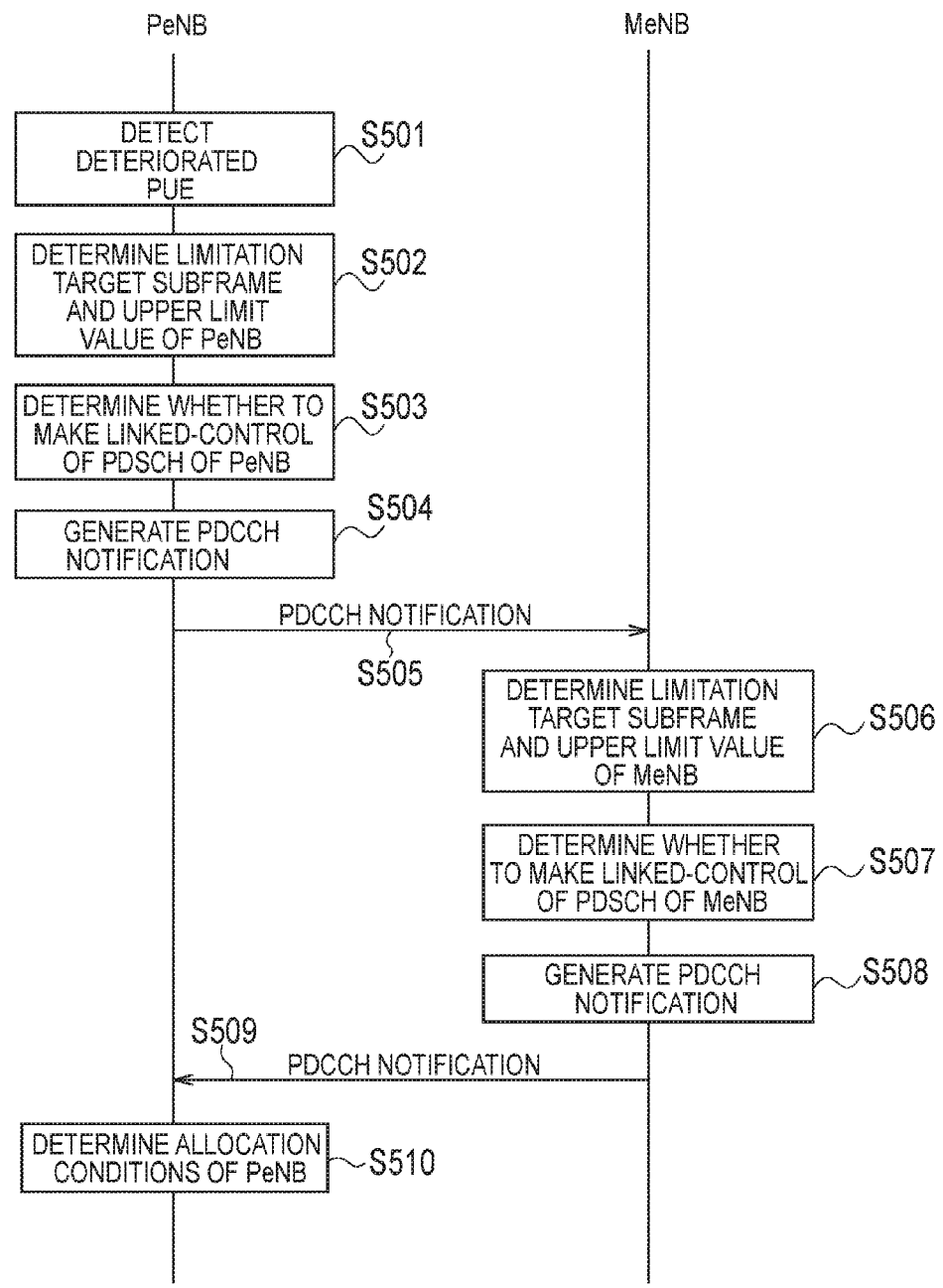

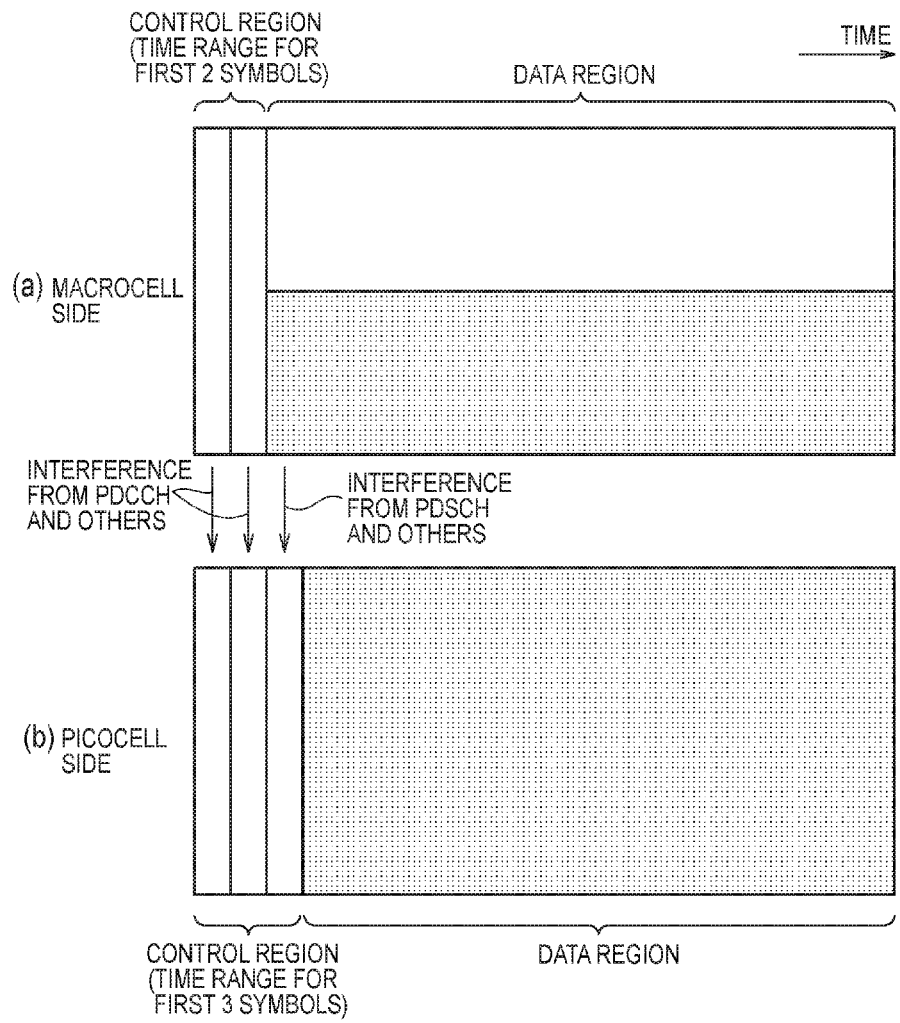

RADIO COMMUNICATION SYSTEM, RADIO BASE STATION, AND COMMUNICATION CONTROL METHOD THAT CAN REDUCE AN INTER-BASE STATION INTERFERENCE BETWEEN DOWNLINK CONTROL CHANNELS

CROSS REFERENCE TO RELATED APPLICATIONS

This application is a Continuation Application of U.S. patent application Ser. No. 13/639,807 filed Nov. 7, 2012, which is the U.S. National Phase Application of International Patent Application No. PCT/JP2011/058637 filed Apr. 5, 2011, which claims benefit of Japanese Patent Application Nos. 2010-087686 filed Apr. 6, 2010, 2010-138802 filed Jun. 17, 2010, 2010-181165 filed Aug. 12, 2010, and 2010-225266 filed Oct. 4, 2010, the entire contents of which are incorporated herein by reference.

TECHNICAL FIELD

The present disclosure relates to a radio communication system, a radio base station, and a communication control method which transmit downlink control information using a downlink control channel.

BACKGROUND ART

The next generation systems achieving higher-speed and larger-capacity communications than the currently-operated 3rd generation and 3.5th generation cellular radio communication systems include LTE (Long Term Evolution) and LTE Advanced being an advanced version of LTE, which are standardized by the standardization organization 3GPP.

In the LTE system (including the LTE Advanced), a radio base station transmits downlink control information (DCI: Downlink Control Information) for controlling radio communications with a radio terminal by using a downlink control channel (PDCCH: Physical Downlink Control CHannel). There is an overlap in frequency band of the downlink control channel between radio base stations.

In the LTE Advanced, discussion is in progress on provision of a heterogeneous network in which there both exist a high-power base station (a so-called macrocell base station) and a low-power base station (a so-called picocell base station or a femtocell base station). The heterogeneous network can distribute a load of the high-power base station to the low-power base station.

In general, a radio terminal connects with a radio base station that provides a radio signal with the highest received power among multiple radio base stations. Thus, in the heterogeneous network, a radio terminal is less likely to connect with the low-power base station. Against these circumstances, there has been proposed a technique of expanding the self-coverage of a low-power base station by controlling a radio terminal so that the radio terminal will connect with the low-power base station even when the received power from the low-power base station is not the highest (see, for example, NON-PATENT DOCUMENT 1).

PRIOR ART DOCUMENT

Non-Patent Document

NON-PATENT DOCUMENT 1: 3GPP R1-10506, "Importance of Serving Cell Selection in Heterogeneous Networks," February, 2010.

SUMMARY

Since there is an overlap in frequency band of the downlink control channel between radio base stations, the downlink control channel used by one of two neighboring radio base stations receives interference from the downlink control channel used by the other radio base station, and therefore the downlink control information on the downlink control channel of the one radio base station cannot be normally received. If the downlink control information cannot be normally received from a radio base station, a radio terminal has difficulty in performing radio communications with the radio base station.

In particular, in the technique of expanding the self-coverage of a low-power base station in a heterogeneous network, the downlink control channel used by the low-power base station is highly likely to receive interference from the downlink control channel used by a high-power base station. Thus, the above-described problem is more serious.

Accordingly, an objective of the present disclosure is to provide a radio communication system, a radio base station, and a communication control method which can reduce an inter-base station interference between downlink control channels.

A first radio base station according to an embodiment comprises a controller including a processor configured to perform a downlink communication using a radio frame configuration comprising a plurality of subframes arranged in a time direction. Each of the plurality of subframes comprises a plurality of resource blocks arranged in a frequency direction. The processor is configured to receive, from a second radio base station which is receiving an interference caused by the first radio base station, via an X2 interface, a request for transmission of a message including a bit string comprising a plurality of bits corresponding to the plurality of subframes, where each bit position of the plurality of bits represents a different subframe number. In response to receiving the request from the second radio base station, the processor is configured to transmit, to the second radio base station via the X2 interface, the message including the bit string comprising the plurality of bits. The plurality of bits comprise "1" bit that indicates a restricted subframe in which the first radio base station restricts a downlink transmission power below a predetermined value, among the plurality of subframes, and "0" bit that indicates a non-restricted subframe in which the first radio base station does not restrict a downlink transmission power below the predetermined value, among the plurality of subframes. A coverage of the second radio base station is extended by connecting a radio terminal to the second radio base station even when strongest detected cell of the radio terminal belongs to the first radio base station, and the restricted subframe enables the radio terminal to be served by the second radio base station even while under the interference from the first base station.

A second radio base station according to an embodiment comprises a controller including a processor configured to transmit, to a first radio base station which is causing an interference to the second radio base station, via an X2 interface, a request for transmission of a message including a bit string. In response to transmitting the request to the first radio base station, the processor is configured to receive the message including the bit string from the first radio base station via the X2 interface. The first radio base station performs a downlink communication using a radio frame configuration comprising a plurality of subframes arranged in a time direction, where each of the plurality of subframes comprises a plurality of resource blocks arranged in a frequency direction. The bit string comprises a plurality of bits corresponding to the plurality of subframes, and each bit position of the plurality of bits represents a different subframe number. The plurality of bits comprise "1" bit that indicates a restricted subframe in which the first radio base station restricts a downlink transmission power below a predetermined value, among the plurality of subframes, and "0" bit that indicates a non-restricted subframe in which the first radio base station does not restrict a downlink transmission power below the predetermined value, among the plurality of subframes. A coverage of the second radio base station is extended by connecting a radio terminal to the second radio base station even when strongest detected cell of the radio terminal belongs to the first radio base station, and the restricted subframe enables the radio terminal to be served by the second radio base station even while under the interference from the first base station.

A communication control method used in a radio communication system includes performing, at a first radio base station, a downlink communication using a radio frame configuration including a plurality of subframes arranged in a time direction, where each of the plurality of subframes comprises a plurality of resource blocks arranged in a frequency direction. The method includes transmitting, from a second radio base station which is receiving an interference caused by the first radio base station, to the first radio base station via an X2 interface, a request for transmission of a message including a bit string corresponding to the plurality of subframes. The method includes receiving, at the first radio base station, the request from the second radio base station. In response to receiving the request from the second radio base station, transmitting, from the first radio base station to the second radio base station via the X2 interface. The message includes the bit string comprising the plurality of bits, where each bit position of the plurality of bits represents a different subframe number. The plurality of bits comprise "1" bit that indicates a restricted subframe in which the first radio base station restricts a downlink transmission power below a predetermined value, among the plurality of subframes, and "0" bit that indicates a non-restricted subframe in which the first radio base station does not restrict a downlink transmission power below the predetermined value, among the plurality of subframes. The method includes receiving, at the second radio base station, the bit string from the first radio base station via the X2 interface. A coverage of the second radio base station is extended by connecting a radio terminal to the second radio base station even when strongest detected cell of the radio terminal belongs to the first radio base station, and the restricted subframe enables the radio terminal to be served by the second radio base station even while under the interference from the first base station.

BRIEF DESCRIPTION OF THE DRAWINGS

FIG. 2(a) is a frame configuration diagram showing a downlink radio frame configuration when the FDD scheme is used, and FIG. 2(b) is a frame configuration diagram showing a downlink subframe configuration.

FIG. 6 is a drawing for illustrating a configuration example of usage control information according to the first embodiment.

FIG. 7 is an operational sequence diagram showing an operational example of a radio communication system according to the first embodiment.

FIG. 11 is a block diagram showing the configuration of a macrocell base station according to the third embodiment.

FIG. 12 is a drawing showing a configuration example of a PDCCH notification message according to the third embodiment.

FIG. 17 is an operational sequence diagram showing an operational example of the radio communication system according to the fifth embodiment.

FIG. 18 is a drawing for illustrating an interference state of a picocell base station with respect to PDCCH according to the sixth embodiment.

FIG. 19 is a drawing for illustrating an example of a message configuration according to the sixth embodiment.

DESCRIPTION OF THE EMBODIMENTS

Figure 1:
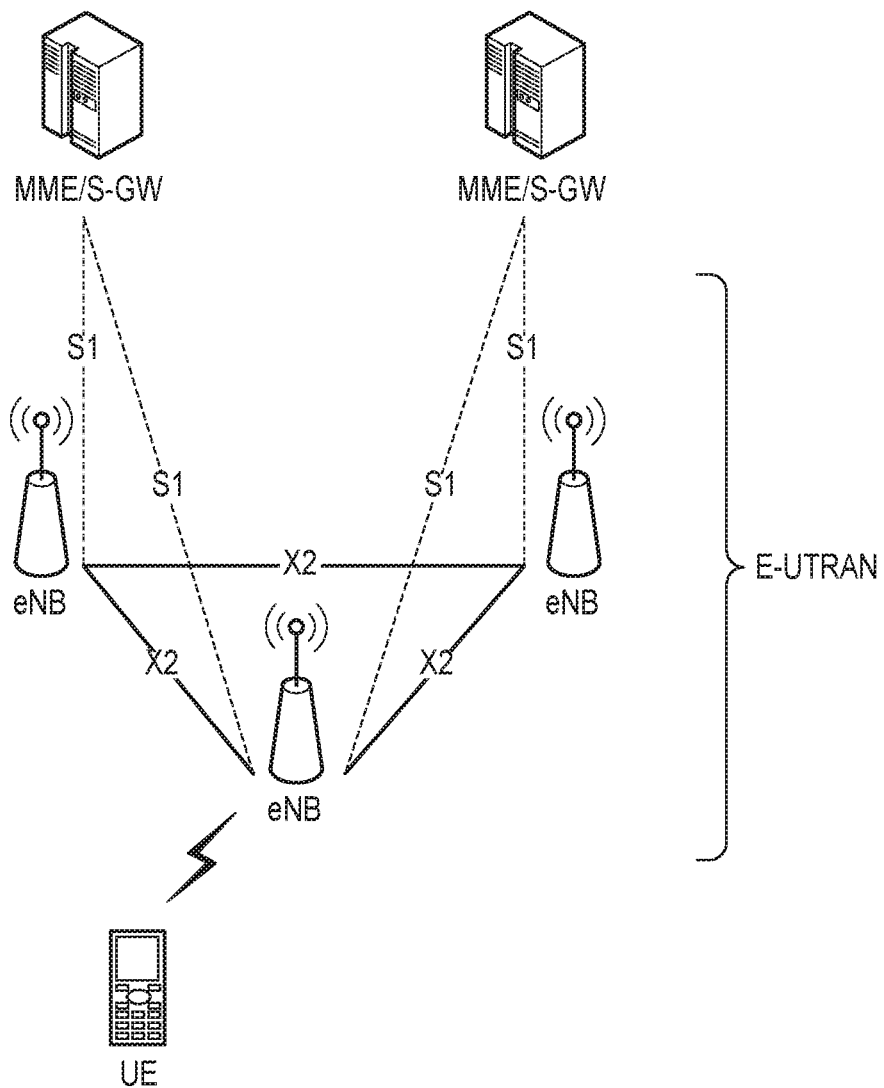
FIG. 1 is a drawing for illustrating a summary of the LTE system according to first to seventh embodiments.

Referring to the drawings, first to seventh embodiments and other embodiments of the present disclosure are described. In the drawings in the embodiments, same or similar reference numerals are given to denote same or similar portions.

[Summary of LTE System]

Before radio base stations according to first to seventh embodiments are described, the summary of the LTE system to which the radio base stations are applied is described with regard to the contents relating to the present disclosure.

FIG. 1 is a drawing for illustrating the summary of the LTE system. As shown in FIG. 1, multiple radio base stations eNB form E-UTRAN (Evolved-UMTS Terrestrial Radio Access Network). Each of the radio base stations eNB forms a cell which is an area where to provide a communication service to a radio terminal UE.

The radio terminal UE is a radio communication apparatus carried by a user, and is also referred to as user equipment. The radio terminal UE connects with one of the radio base stations eNB whose received power of a reference signal (RSRP: Reference Signal Received Power) is the highest. However, not only the RSRP, another receiving quality index such as an SNR (Signal to Noise ratio) may be used.

The radio base stations eNB are capable of communicating with one another via an X2 interface which is a logical communication path to provide communications between the base stations. Each of the radio base stations eNB is capable of communicating with EPC (Evolved Packet Core), specifically, an MME (Mobility Management Entity)/(S-GW (Serving Gateway)) via an S1 interface.

In the radio communications between the radio base station eNB and the radio terminal UE, the OFDMA (Orthogonal Frequency Division Multiple Access) scheme and SC-FDMA (Single-Carrier Frequency Division Multiple Access) scheme are respectively applied as a downlink multiplex mode and an uplink multiplex mode. In addition, the FDD (Frequency Division Duplex) scheme or TDD (Time Division Duplex) scheme is applied as a complex communication mode.

FIG. 2(a) is a frame configuration diagram showing a downlink radio frame configuration when the FDD scheme is used.

As shown in FIG. 2(a), the downlink radio frame is formed of 10 downlink subframes and each downlink subframe is formed of 2 downlink slots. Each downlink subframe has a length of 1 ms and each downlink slot has a length of 0.5 ms. In addition, each downlink slot includes 7 OFDM symbols (transmission symbols) in the time axis direction (a time domain) and multiple resource blocks (RBs) in the frequency axis direction (a frequency domain). Each RB includes 12 sub-carriers.

FIG. 2(b) is a frame configuration diagram showing the configuration of the downlink subframe.

As shown in FIG. 2(b), the downlink subframe includes two continuous downlink slots. A section from the head of the first downlink slot in the downlink subframe to a maximum of 3 OFMD symbols is a control region forming radio resource which is used as PDCCH for transmitting control information DCI. The DCI corresponds to uplink and downlink scheduling information. Note that described herein is that a maximum of 3 OFDM symbols are used, but a maximum of 4 symbols can be used if the system bandwidth is narrow.

A remaining OFDM symbol section of the downlink subframe is a data region forming radio resource which is used as PDSCH (Physical Downlink Shared Channel) for transmitting data information. Note that the control region may include PCFICH (Physical Control Format Indicator Channel) and PHICH (Physical Hybrid Automatic Repeat Request Indicator Channel) in addition to the PDCCH.

The radio terminal UE can specify data information which is transmitted via the PDSCH by decoding the DCI transmitted by the PDCCH. The radio terminal UE can specify the number of OFDM symbols in the time axis direction in the control region within the downlink subframe with the PCFICH.

The transmission in the PDCCH is performed for each resource unit including 36 symbols referred to as CCE (Control Channel Elements). In other words, the radio base station eNB can control a coding rate by controlling the number of allocated CCEs for each radio terminal UE. The radio terminal UE which can decode even at a high coding rate can effectively utilize the radio resource by reducing the number of the allocated CCEs. The radio terminal UE performs blind decoding, specifically, decoding on all the numbers of CCEs and detects the number of CCEs which can be correctly decoded as the number of allocated CCEs.

First Embodiment

Hereinafter, the first embodiment of the disclosure is described. The first embodiment is an embodiment when the present disclosure is applied to a heterogeneous network.

(1) Configuration of Radio Communication System

Figure 3:
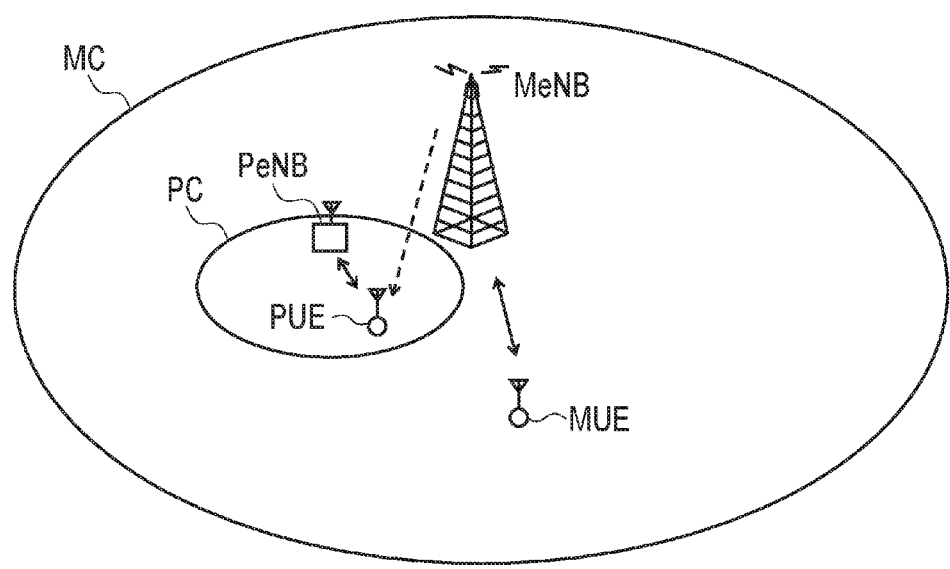
FIG. 3 is a schematic configuration diagram of a radio communication system according to the first embodiment.

A schematic configuration of a radio communication system according to the first embodiment is described. FIG. 3 is a schematic configuration diagram of a radio communication system 1A according to the first embodiment.

As shown in FIG. 3, the radio communication system 1A has a macrocell base station MeNB (a high-power base station or high-output base station), a radio terminal MUE connected with the macrocell base station MeNB, a picocell base station PeNB which is installed within a macrocell formed by the macrocell base station MeNB and neighbors on the macrocell base station MeNB, and a radio terminal PUE connected with the picocell base station PeNB within a picocell PC formed by the picocell base station PeNB (a low-power base station or a low-output base station).

The picocell base station PeNB (also referred to as a hot zone node) is a low-power base station whose transmission output (maximum transmission power) is smaller than that of the macrocell base station MeNB. Accordingly, in the heterogeneous network, the picocell base station PeNB (a range capable of accommodating the radio terminal UE) may have a small self-coverage with application of a selection standard in which the radio terminal UE selectively connects with the radiobase station eNB having the highest RSRP. In particular, under the situation where the picocell base station PeNB is close to the macrocell base station MeNB, the self-coverage of the picocell base station PeNB becomes extremely small. Thus, the picocell base station PeNB cannot be effectively utilized.

The following two methods can be mainly used as methods in which the self-coverage of the picocell base station PeNB can be expanded without increasing the transmission output of the picocell base station PeNB.

First, there is a method of selecting a radio base station having the smallest propagation loss (path loss) with a radio terminal UE as a connection destination for the radio terminal UE without selecting the radio base station eNB transmitting a radio signal having the largest RSRP as a connection destination for the radio terminal UE. This can expand the self-coverage of the picocell base station PeNB because, for example, the radio base station eNB nearest to the radio terminal UE is selected as the connection destination.

Second, there is a method in which when a radio terminal UE can receive a radio signal from each of the macrocell base station MeNB and the picocell base station PeNB and compares the RSRP of the picocell base station PeNB and the RSRP of the macrocell base station MeNB with each other, the radio terminal UE adds an offset value to the RSRP of the picocell base station PeNB. The offset value is added to the RSRP of the picocell base station PeNB, which increases a possibility that the RSRP after the offset will exceed the RSRP of the macrocell base station MeNB. Accordingly, the self-coverage of the picocell base station PeNB can be expanded because the picocell base station PeNB is preferentially selected as a connection destination.

Instead of the addition of the offset value to the RSRP of the picocell base station PeNB, a subtraction of an offset value from the RSRP of the macrocell base station MeNB can also produce a similar effect.

In the first embodiment, it is assumed that the self-coverage of the picocell base station PeNB is in an expanded state by any one of the above two methods or another method. Note that a subject of selecting the radio terminal UE is the radio terminal UE if the radio terminal UE is in stand-by (an idle state) and is the radio base station eNB in a connection destination if the radio terminal UE is in communication (an active state). In the active state, a measured RSRP value is periodically reported from the radio terminal UE to the radio base station eNB in the connection destination. Thus, the radio base station eNB in the connection destination can select the next connection destination of the radio terminal UE.

The macrocell base station MeNB transmits DCI for controlling radio communications with the radio terminal MUE by using PDCCH. The picocell base station PeNB transmits DCI for controlling radio communications with the radio terminal PUE by using PDCCH. Frequency bands of these PDCCHs overlap with each other. In addition, the respective PDCCHs of the macrocell base station MeNB and the picocell base station PeNB also overlap with each other in the time axis. As a result, the respective PDCCHs of the macrocell base station MeNB and the picocell base station PeNB interfere with each other.

In the state where the self-coverage of the picocell base station PeNB is expanded, the radio terminal PUE connecting with the picocell base station PeNB is sometimes in a state where received power (RSRP) from the macrocell base station MeNB is higher than received power (RSRP) from the picocell base station PeNB. In this case, the PDCCH which is used by the picocell base station PeNB receives a large interference from the PDCCH which is used by the macrocell base station MeNB. Thus, the radio terminal PUE cannot receive (decode) the DCI.

For this reason, in the first embodiment, the picocell base station PeNB transmits usage control information for controlling a PDCCH usage which is an amount of radio resources used by the macrocell base station MeNB as PDCCH to the macrocell base station MeNB via the X2 interface. Here, the PDCCH usage means, for example, the number of OFDM symbols in the time axis direction in the above-described control region or a CCE amount in the control region. In addition, the PDCCH usage is a concept including a PDCCH usage rate. The PDCCH usage in the macrocell base station MeNB is reduced, so that the PDCCH used by the picocell base station PeNB is reduced in interference received by the PDCCH used by the macrocell base station MeNB.

(2) Configuration of Picocell Base Station

Figure 4:
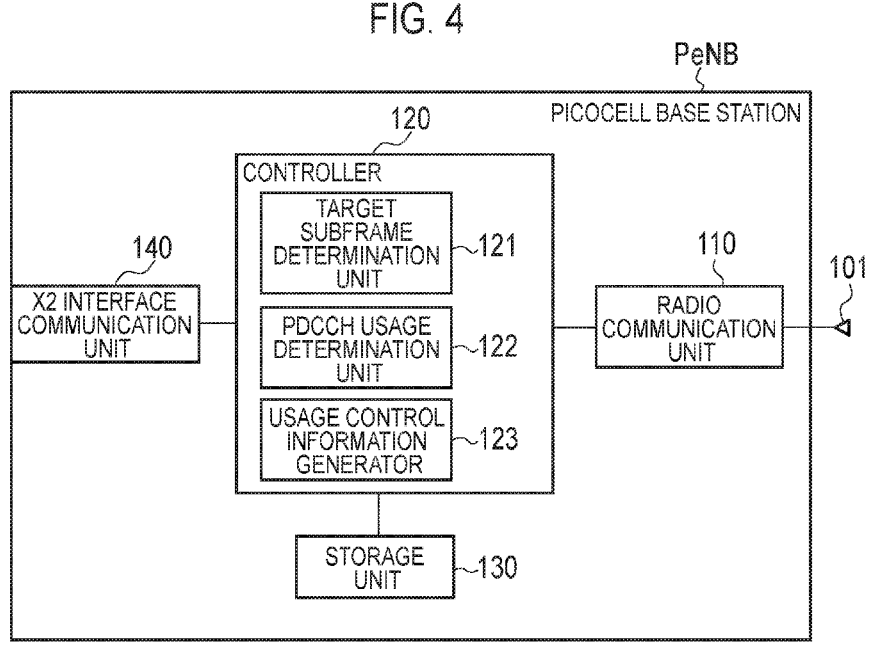
FIG. 4 is a block diagram showing the configuration of a picocell base station according to the first embodiment.

Hereinafter, the configuration of the picocell base station PeNB is described. FIG. 4 is a block diagram showing the configuration of the picocell base station PeNB.

As shown in FIG. 4, the picocell base station PeNB has an antenna unit 101, a radio communication unit 110, a controller 120, a storage unit 130, and an X2 interface communication unit 140. In the first embodiment, the X2 interface communication unit 140 corresponds to a transmitter to transmit control information.

The radio communication unit 110 is configured using, for example, a radio frequency (RF) circuit and a base band (BB) circuit, and transmits/receives a radio signal to/from the radio terminal PUE via the antenna unit 101. Also, the radio communication unit 110 modulates the transmission signal and demodulates the received signal.

The controller 120 is configured using, for example, a CPU and controls various kinds of functions included in the picocell base station PeNB. The storage unit 130 is configured using, for example, a memory, and stores various pieces of information to be used for controlling the picocell base station PeNB and the like. The X2 interface communication unit 140 performs inter-base station communications with other radio base stations using the X2 interface.

The controller 120 has a target subframe determination unit 121, a PDCCH usage determination unit 122, and a usage control information generator 123.

The target subframe determination unit 121 determines a target subframe per one radio frame to be a target in which a PDCCH usage of the macrocell base station MeNB is controlled. In other words, the usage control information is configured so that the PDCCH usage can be designated per a downlink subframe. For example, the target subframe determination unit 121 may determine a target subframe according to a ratio of UEs requiring suppression of PDCCH interference with respect to multiple radio terminals PUEs connected with the picocell base station PeNB. For example, the target subframe determination unit 121 increases the number of target subframes as the ratio of UE requiring the suppression of the PDCCH interference becomes higher. Note that, the target subframe determination unit 121 can specify the radio terminal PUE requiring the suppression of the PDCCH interference with reception quality information (such as a measurement report) which is reported from each radio terminal PUE. Furthermore, when the PDCCH of the macrocell base station MeNB is controlled by another picocell base station, it is preferable that the target subframe determination unit 121 coordinate the control of its own picocell base station with the control of the other picocell base station. In other words, the target subframe determination unit 121 determines the same subframe as the target subframe determined by the other picocell base station. To this purpose, the macrocell base station MeNB or the other picocell base station may be configured to notify, to the picocell base station PeNB, information indicating the current target subframe via the X2 interface. Or, the picocell base station PeNB may request the macrocell base station MeNB or the other picocell base station to notify the information indicating the current target subframe.

The PDCCH usage determination unit 122 determines a PDCCH usage of the macrocell base station MeNB in the target subframe determined by the target subframe determination unit 121. However, the PDCCH usage determination unit 122 may determine the PDCCH usage for all the subframes. When the PDCCH usage determination unit 122 determines a PDCCH usage for all the subframes, the target subframe determination unit 121 is unnecessary.

When the self-coverage of the picocell base station PeNB is expanded, the PDCCH usage determination unit 122 determines to decrease the PDCCH usage as compared with the case where the self-coverage is not expanded. When a connection destination is selected not based on RSRP but based on a path loss, or when the RSRP is offset, the self-coverage of the picocell base station PeNB is expanded. The information on whether the self-coverage is expanded is stored in the storage unit 130 in advance or is acquired from the macrocell base station MeNB. When an offset value is added to the RSRP of the picocell base station PeNB or when the offset value is subtracted from the RSRP of the macrocell base station MeNB, the PDCCH usage determination unit 122 may determine a PDCCH usage according to the offset value. Specifically, when the offset value is large (in other words, the self-coverage of the picocell base station PeNB is greatly expanded), the PDCCH usage determination unit 122 preferably makes a determination so that the PDCCH usage of the macrocell base station MeNB is decreased.

For example, the PDCCH usage determination unit 122 determines the number of OFDM symbols in the time axis direction, which are usable as PDCCH in the downlink subframe, in a range of 1 to 3 (or 1 to 4) as a PDCCH usage. Or, the PDCCH usage determination unit 122 determines a percentage of CCE permitting transmission of the downlink control information, among all the CCEs usable as PDCCH in the downlink subframe as a PDCCH usage.

The usage control information generator 123 generates usage control information by associating the target subframe determined by the target subframe determination unit 121 with the PDCCH usage determined by the PDCCH usage determination unit 122. Or, the usage control information generator 123 generates usage control information containing information indicating the PDCCH usage for each downlink subframe determined by the PDCCH usage determination unit 122. The specific configuration example of the usage control information is described later.

The X2 interface communication unit 140 transmits the usage control information generated by the usage control information generator 123 through the X2 interface. When multiple neighboring base stations are present in the neighborhood of the picocell base station PeNB, the X2 interface communication unit 140 may transmit the usage control information only to a specific neighboring base station among the multiple neighboring base stations.

(3) Configuration of Macrocell Base Station

Figure 5:
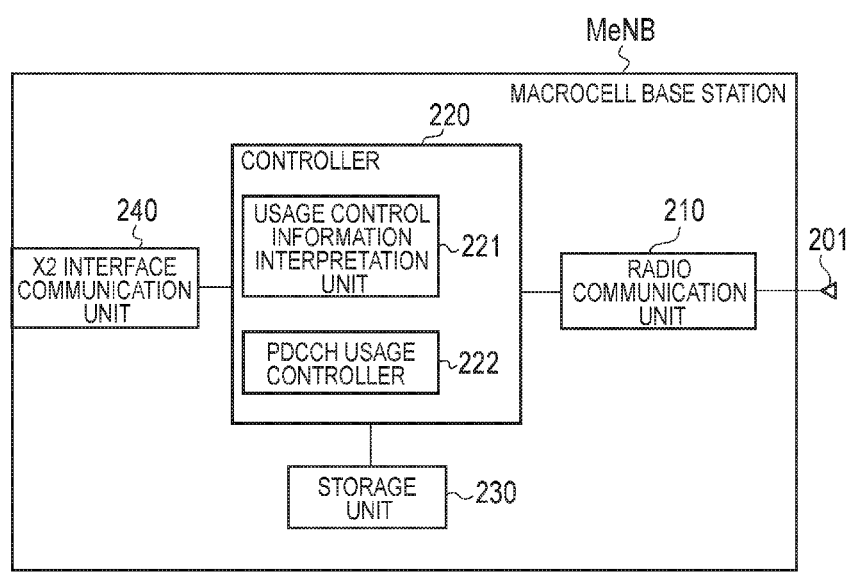
FIG. 5 is a block diagram showing the configuration of a macrocell base station according to the first embodiment.

Hereinafter, the configuration of the macrocell base station MeNB is described. FIG. 5 is a block diagram showing the configuration of the macrocell base station MeNB.

As shown in FIG. 5, the macrocell base station MeNB has an antenna unit 201, a radio communication unit 210, a controller 220, a storage unit 230, and an X2 interface communication unit 240. In the first embodiment, the X2 interface communication unit 240 corresponds to a receiver to receive control information.

The radio communication unit 110 is configured using, for example, a radio frequency (RF) circuit and a base band (BB) circuit, and transmits/receives a radio signal to/from the radio terminal MUE via the antenna unit 201. Also, the radio communication unit 210 modulates the transmission signal and demodulates the received signal.

The controller 220 is configured using, for example, a CPU and controls various kinds of functions included in the macrocell base station MeNB. The storage unit 230 is configured using, for example, a memory, and stores various pieces of information to be used for controlling the macrocell base station MeNB and the like. The X2 interface communication unit 240 performs inter-base station communications with other radio base stations using the X2 interface.

The controller 220 has a usage control information interpretive unit 221 and a PDCCH usage controller 222.

The usage control information interpretive unit 221 interprets usage control information received by the X2 interface communication unit 240 and specifies a target subframe and a PDCCH usage thereof. Or, the usage control information interpretive unit 221 interprets usage control information and specifies a PDCCH usage per subframe.

The PDCCH usage controller 222 controls the PDCCH usage for each target subframe according to the target subframe and the PDCCH usage thereof which are specified by the usage control information interpretive unit 221. The PDCCH usage controller 222 controls the number of OFDM symbols in the time axis direction, which are usable as PDCCH in the downlink subframe (in other words, the number of OFDM symbols in the time axis direction in the control region) within a range of 1 to 3 (or 1 to 4) according to the PDCCH usage specified by the usage control information interpretive unit 221. Or, the PDCCH usage controller 222 controls the CCE amount (in other words, a coding rate) of PDCCH (control region) according to the PDCCH usage specified by the usage control information interpretive unit 221.

Note that as described above, when the PDCCH of the macrocell base station MeNB is controlled by another picocell base station, the controller 220 may notify the picocell base station PeNB of the information indicating the current target subframe by using the X2 interface communication unit 240 via the X2 interface. Or, when the controller 220 is requested by the picocell base station PeNB to notify the information indicating the current target subframe, the controller 220 may notify the picocell base station PeNB of the information indicating the current subframe by using the X2 interface communication unit 240.

(4) Configuration Example of Usage Control Information

Hereinafter, a configuration example of usage control information is described. FIG. 6 is a drawing for illustrating a configuration example of usage control information. Note that, in the first embodiment, the usage control information is transmitted at intervals of one radio frame, but it may be transmitted at intervals of one subframe.

As shown in FIG. 6, the usage control information contains a source ID identifying a source base station of the usage control information, a destination ID identifying a destination base station of the usage control information, and information indicating a PDCCH usage per subframe. The destination ID is contained in the usage control information, so that the usage control information can be transmitted to a specific destination base station.

The information indicating the PDCCH usage for each downlink subframe is configured by the following configuration methods.

A first configuration method is that, for example, a PDCCH usage is designated for each of 10 subframes contained in one radio frame. In this case, the number of OFDM symbols of the PDCCH in the time axis direction is designated in a range of 1 to 3 (or 1 to 4) for each of the 10 subframes contained in the one radio frame. For example, 2-bit information is allocated for each subframe, and "00," "01," "10," and "11" are respectively corresponded to 1 symbol, 2 symbols, 3 symbols, and 4 symbols. Or, an allowable CCE amount is designated in a stepwise fashion for each of the 10 subframes contained in the one radio frame. In this case, for example, 2-bit information is allocated for each subframe, and "00," "01," "10," and "11" are respectively corresponded to 25%, 50%, 75%, and 100%.

A second configuration method is that, for example, a PDCCH usage is collectively designated for a target subframe among the 10 subframes contained in the one radio frame. For example, when the number of OFDM systems in the second and fifth subframes is set to be 2, the PDCCH usage is set to be "01," and the designated subframe can be configured by a bitmap of "0100100000."

(5) Operational Example of Radio Communication System

FIG. 7 is an operational sequence diagram showing an operational example of the radio communication system 1A.

At step S11, the target subframe determination unit 121 of the picocell base station PeNB determines a target subframe in which a PDCCH usage of the macrocell base station MeNB is controlled. The PDCCH usage determination unit 122 of the picocell base station PeNB determines a PDCCH usage of the macrocell base station MeNB in the target subframe determined by the target subframe determination unit 121.

At step S12, the usage control information generator 123 of the picocell base station PeNB generates usage control information by associating the target subframe determined by the target subframe determination unit 121 with the PDCCH usage determined by the PDCCH usage determination unit 122.

At step S13, the X2 interface communication unit 140 of the picocell base station PeNB transmits the usage control information generated by the usage control information generator 123 to the macrocell base station MeNB. The X2 interface communication unit 240 of the macrocell base station MeNB receives the usage control information.

At step S14, the usage control information interpretive unit 221 of the macrocell base station MeNB interprets the usage control information received by the X2 interface communication unit 240 and specifies a target subframe and a PDCCH usage thereof.

At step S15, the PDCCH usage controller 222 of the macrocell base station MeNB controls the PDCCH usage for each target subframe according to the target subframe and the PDCCH usage thereof which are specified by the usage control information interpretive unit 22.

(6) Effects of First Embodiment

As described above, the picocell base station PeNB can control the PDCCH usage of the macrocell base station with the usage control information and can reduce the interference of the PDCCH used by the macrocell base station MeNB, which is received by the PDCCH used by the picocell base station PeNB. Accordingly, even when the self-coverage of the picocell base station PeNB is expanded, the radio terminal PUE connecting with the picocell base station PeNB can properly receive DCI.

Also, the PDCCH usage is controlled according to the usage control information received from the picocell base station PeNB, so that the macrocell base station MeNB can reduce the interference of the PDCCH used by the macrocell base station MeNB, which is given to the PDCCH used by the picocell base station PeNB. Accordingly, even when the picocell base station PeNB expands the self-coverage, the radio terminal PUE connecting with the picocell base station PeNB can properly receive DCI.

In the first embodiment, when the self-coverage of the picocell base station PeNB is expanded, the picocell base station PeNB transmits the usage control information to reduce the PDCCH usage. Accordingly, the radio terminal PUE connecting with the picocell base station PeNB can increase a possibility that the radio terminal PUE can properly receive DCI from the picocell base station PeNB even in a case where received power (RSRP) from the macrocell base station MeNB is higher than received power (RSRP) from the picocell base station PeNB.

In the first embodiment, the picocell base station PeNB transmits the usage control information only to the macrocell base station MeNB, so that a PDCCH usage of another neighboring base station can be prevented from being unnecessarily decreased.

Note that although the PDSCH interference between base stations is not described in the above description, the PDSCH can be dealt with existing techniques such as adaptive modulation control, hybrid automatic retransmission request (HARQ), and cell-to-cell interference control (ICIC).

Second Embodiment

A second embodiment is an embodiment in which a PDCCH interference between macrocell base stations is controlled. Portions different from those of the first embodiment are described in the following second embodiment, and the duplicated description is omitted.

(1) Configuration of Radio Communication System

Figure 8:
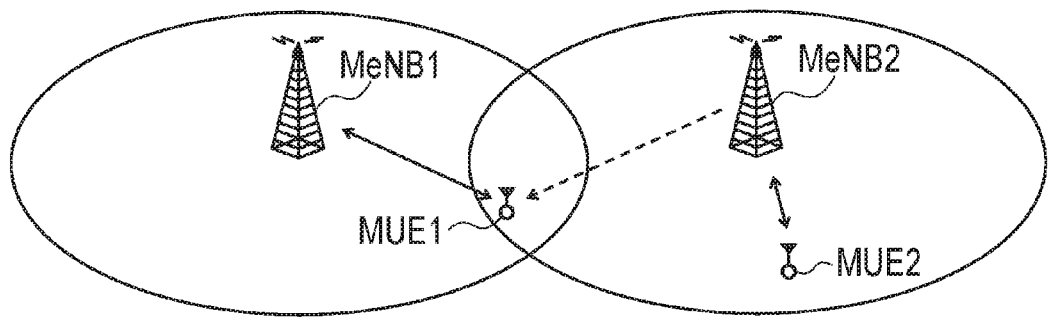
FIG. 8 is a schematic configuration diagram of a radio communication system according to the second embodiment.

A schematic configuration of a radio communication system according to the second embodiment is described. FIG. 8 is a schematic configuration diagram of a radio communication system 1B according to the second embodiment.

As shown in FIG. 8, the radio communication system 1B has a macrocell base station MeNB1, a radio terminal MUE1 connecting with the macrocell base station MeNB1, a macrocell base station MeNB2 neighboring on the macrocell base station MeNB1, and a radio terminal MUE2 connecting with the macrocell base station MeNB2 within a cell formed by the macrocell base station MeNB2.

When the radio terminal MUE1 connected with the macrocell base station MeNB1 is located near a cell edge, the radio terminal MUE1 is affected by the interference of the PDCCH used by the macrocell base station MeNB2 neighboring on the macrocell base station MeNB1. Thus, there is a case where DCI transmitted by the macrocell base station MeNB1 through the PDCCH cannot be properly received.

For this reason, in the second embodiment, the macrocell base station MeNB1 transmits usage control information for controlling the PDCCH usage of the macrocell base station MeNB2 to the macrocell base station MeNB2 via the X2 interface. Here, as similar to the first embodiment, the PDCCH use amount means, for example, the number of OFDM symbols in the time axis direction in the control region or a CCE amount in the control region. The PDCCH usage of the macrocell base station MeNB2 is reduced, so that the PDCCH used by the macrocell base station MeNB1 is reduced in interference received from the PDCCH used by the macrocell base station MeNB2.

In the second embodiment, the block configuration of the macrocell base station MeNB1 is similar to the block configuration of the picocell base station PeNB, which is described in the first embodiment, and the block configuration of the macrocell base station MeNB2 is similar to the block configuration of the macrocell base station MeNB, which is described in the first embodiment.

(2) Operational Example of Radio Communication System

Figure 9:
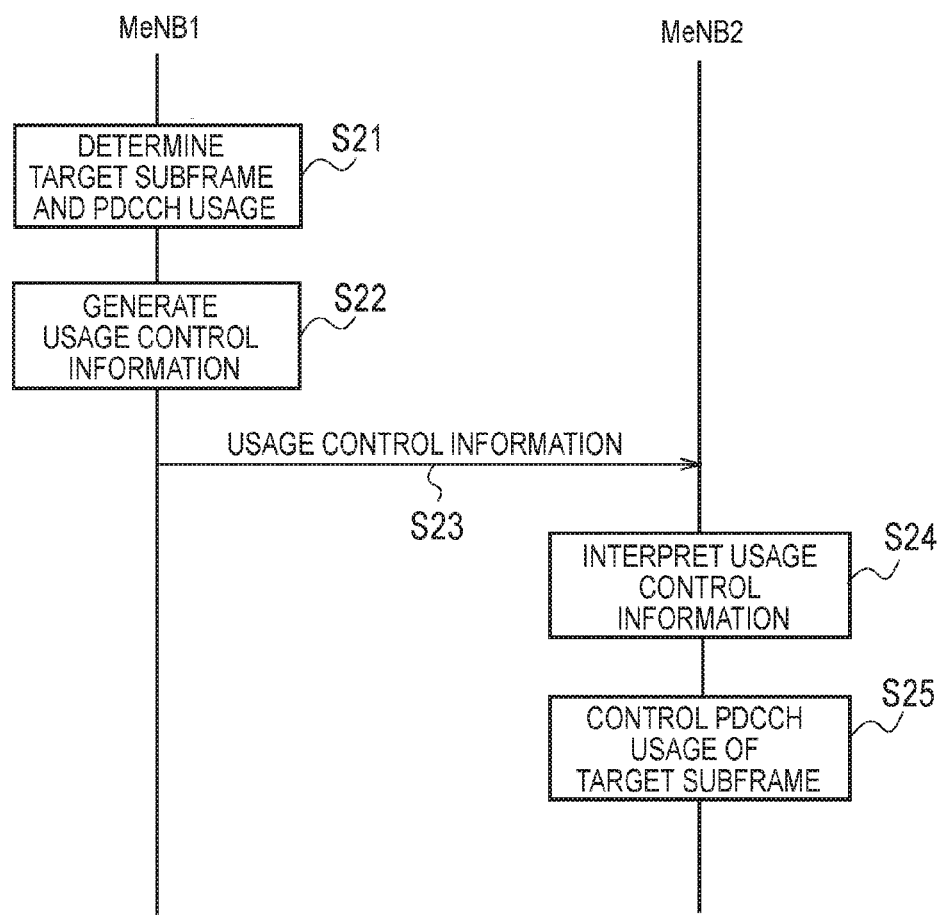
FIG. 9 is an operational sequence diagram showing an operational example of the radio communication system according to the second embodiment.

FIG. 9 is an operational sequence diagram showing an operational example of the radio communication system 1B according to the second embodiment.

At step S21, the target subframe determination unit 121 of the macrocell base station MeNB1 determines a target subframe in which a PDCCH usage of the macrocell base station MeNB2 is controlled. The PDCCH usage determination unit 122 of the macrocell base station MeNB1 determines a PDCCH usage of the macrocell base station MeNB2 in the target subframe determined by the target subframe determination unit 121.

At step S22, the usage control information generator 123 of the macrocell base station MeNB1 generates usage control information by associating the target subframe determined by the target subframe determination unit 121 with the PDCCH usage determined by the PDCCH usage determination unit 122.

At step S23, the X2 interface communication unit 140 of the macrocell base station MeNB1 transmits the usage control information generated by the usage control information generator 123 to the macrocell base station MeNB2. The X2 interface communication unit 240 of the macrocell base station MeNB2 receives the usage control information.

At step S24, the usage control information interpretive unit 221 of the macrocell base station MeNB2 interprets the usage control information received by the X2 interface communication unit 240 and specifies a target subframe and a PDCCH usage thereof.

At step S25, the PDCCH usage controller 222 of the macrocell base station MeNB2 controls the PDCCH usage for each target subframe according to the target subframe and the PDCCH usage thereof which are specified by the usage control information interpretive unit 221.

(3) Effects of Second Embodiment

As described above, the macrocell base station MeNB1 can control the PDCCH usage of the macrocell base station MeNB2 with the usage control information and can reduce the interference of the PDCCH used by the macrocell base station MeNB, which is received by the PDCCH used by the macrocell base station MeNB2.

Also, the macrocell base station MeNB2 controls the PDCCH usage according to the usage control information received from the macrocell base station MeNB1, and thereby can reduce the interference of the PDCCH used by the macrocell base station MeNB2, which is given to the PDCCH used by the macrocell base station MeNB1.

Third Embodiment

Hereinafter, a third embodiment of the disclosure is described. Described in the third embodiment is an interference control technique applied to the radio communication system 1A by the heterogeneous network same as that of FIG. 3. Specifically, the description is given in the following order of (1) Configuration of Picocell Base Station, (2) Configuration of Macrocell Base Station, (3) Configuration Example of PDCCH Notification Message, (4) Operational Example of Radio Communication System, and (5) Effects of Third Embodiment. However, portions different from those of the first embodiment are mainly described, and the duplicated description is omitted.

(1) Configuration of Picocell Base Station

Figure 10:
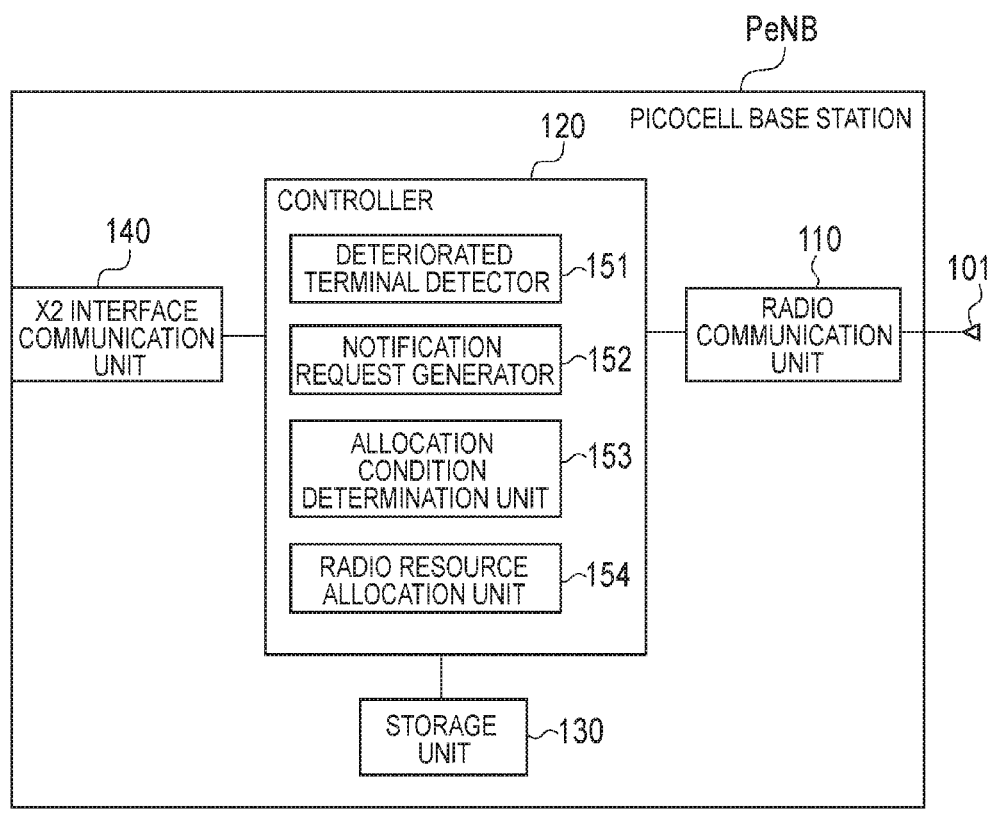
FIG. 10 is a block diagram showing the configuration of a picocell base station according to the third embodiment.

FIG. 10 is a block diagram showing the configuration of a picocell base station PeNB according to the third embodiment. As shown in FIG. 10, a picocell base station PeNB according to the third embodiment is different from that of the first embodiment in the configuration of a controller 120.

The controller 120 has a deteriorated terminal detector 151, a notification request generator 152, an allocation condition determination unit 153, and a radio resource allocation unit 154.

The deteriorated terminal detector 151 detects a deteriorated radio terminal PUE whose receiving quality is deteriorated due to strong interference based on reception quality information (such as a measurement report or CQI) reported from each radio terminal PUE connected with the picocell base station PeNB. The information on the detected deteriorated radio terminal PUE is input to the notification request generator 152.

The notification request generator 152 generates a PDCCH notification request message for requesting transmission of a PDCCH notification message in response to the detection of the deteriorated radio terminal PUE. The PDCCH notification message is a message for notifying a PDCCH usage state in the macrocell base station MeNB. The configuration of the PDCCH notification message is described later.

The allocation condition determination unit 153 determines a subframe whose PDCCH and PDSCH are allocated to the deteriorated radio terminal PUE based on the PDCCH notification message received by the X2 interface communication unit 140 from the macrocell base station MeNB. Also, the allocation condition determination unit 153 may determine usages (including a usage rate) of PDCCH resource and PDSCH resource in the determined subframe. In the present embodiment, the allocation condition determination unit 153 determines allocation conditions for 10 subframes corresponding to one radio frame.

The radio resource allocation unit 154 allocates PDCCH and PDSCH for each radio terminal PUE connecting with the picocell base station PeNB for each subframe according to the allocation conditions (in other words, the subframe in which the PDCCH and PDSCH are allocated to the deteriorated radio terminal PUE and the usages of the PDCCH resource and the PDSCH resource in the subframe) determined by the allocation condition determination unit 153.

(2) Configuration of Macrocell Base Station

FIG. 11 is a block diagram showing the configuration of a macrocell base station MeNB according to the third embodiment. As shown in FIG. 11, a macrocell base station MeNB according to the third embodiment is different from that of the first embodiment in the configuration of a controller 220.

The controller 220 has a target subframe determination unit 251, an upper limit value determination unit 252, a PDSCH linked-control determination unit 253, a PDCCH notification generator 254, and a radio resource allocation unit 255.

The target subframe determination unit 251 interprets the PDCCH notification request message received by the X2 interface communication unit 240 from the picocell base station PeNB and determines a limitation target subframe in which the PDCCH usage of the macrocell base station MeNB is limited to an upper limit value or below, among the 10 subframes corresponding to one radio frame.

The upper limit value determination unit 252 interprets the PDCCH notification request message received by the X2 interface communication unit 240 and determines an upper limit value of the PDCCH usage in the limitation target subframe.

The PDSCH linked-control determination unit 253 determines whether to make linked-control of the PDSCH usage of the macrocell base station MeNB in the limitation target subframe determined by the target subframe determination unit 251. The "linked-control" means that the upper limit value of the PDCCH usage in the limitation target subframe and the upper limit value of the PDSCH usage are linked to each other. For example, if the upper limit value of the PDCCH usage in the limitation target subframe is determined as 10%, the upper limit value of the PDSCH usage in the limitation target subframe is also determined as 10%.

In this manner, the target subframe determination unit 251, the upper limit value determination unit 252, and the PDSCH linked-control determination unit 253 configure the allocation condition determination unit 250 to determine the allocation conditions for the 10 subframes corresponding to one radio frame.

The PDCCH notification generator 254 generates a PDCCH notification message based on the limitation target subframe determined by the target subframe determination unit 251, the upper limit value determined by the upper limit value determination unit 252, and whether to make the linked-control that is determined by the PDSCH linked-control determination unit 253.

The radio resource allocation unit 255 allocates PDCCH and PDSCH to each radio terminal MUE connecting with the macrocell base station MeNB for each subframe according to the allocation conditions (in other words, the limitation target subframe, the upper limit value of the PDCCH usage in the limitation target subframe, and the on/off of the linked-control of the PDSCH usage in the limitation target subframe) determined by the allocation condition determination unit 250.

(3) Configuration Example of PDCCH Notification Message

FIG. 12 is a drawing showing a configuration example of a PDCCH notification message. As shown in FIG. 12, the PDCCH notification message includes a field F1 storing a source base station ID to identify a source of the message (i.e., the macrocell base station MeNB), a field F2 storing a destination base station ID to identify a destination of the message (i.e., the picocell base station PeNB), a field F3 storing an information element indicating a limitation target subframe in one radio frame, a field F4 storing an information element indicating an upper limit value of a PDCCH usage in the limitation target subframe, and a filed F5 storing an information element indicating on/off of the linked-control of the PDSCH in the limitation target subframe. However, it is also possible to have the configuration such that the field F2 storing the destination base station ID is not needed and the message is broadcasted to all the neighboring base stations.

As similar to the first embodiment, the information element indicating the limitation target subframe in one radio frame is configured as, for example, a bitmap including bits which are respectively associated with the subframes contained in one radio frame. For example, when the second and fifth subframes are the limitation target subframes, the second and fifth bits are set as "1" like "0100100000."

The information element indicating the upper limit value of the PDCCH usage in the limitation target subframe is configured so that "00," "01," "10," and "11" are respectively set as 0%, 20%, 40%, and 60% when for example, it is set as 2-bit information.

The information element indicating on/off of the linked-control of the PDSCH in the limitation target subframe is configured as 1-bit information such for example as "1" if the linked-control of the PDSCH is "on," and "0" if the linked-control of the PDSCH is "off." However, when it is determined in advance that the linked-control of the PDSCH is always "on" in the case where the upper limit value of the PDCCH usage is 0%, the information element indicating on/off of the linked-control of the PDSCH is unnecessary.

(4) Operational Example of Radio Communication System

Figure 13:
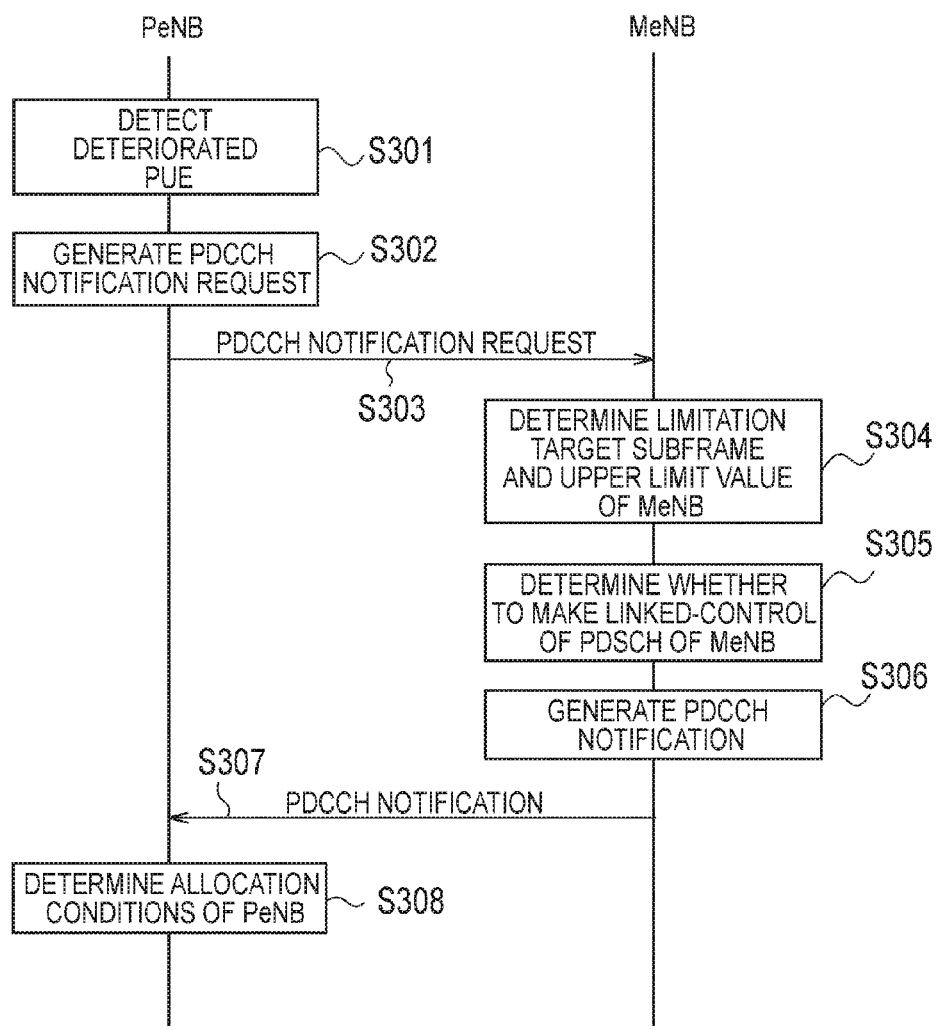
FIG. 13 is an operational sequence diagram showing an operational example of the radio communication system according to the third embodiment.

FIG. 13 is an operational sequence diagram showing an operational example of the radio communication system 1A according to the third embodiment.

At step S301, the deteriorated terminal detector 151 of the picocell base station PeNB detects a deteriorated radio terminal PUE whose receiving quality is deteriorated due to strong interference based on reception quality information (such as a measurement report or CQI) reported from each radio terminal PUE connecting with the picocell base station PeNB. For example, the measurement report contains received power (RSRP) of a reference signal which is received by the radio terminal PUE and information identifying a transmission destination base station of the reference signal. For this reason, when the RSRP of the radio base station eNB other than the picocell base station PeNB exceeds a threshold, the deteriorated terminal detector 151 detects the radio terminal PUE which is the source of the measurement report as a deteriorated radio terminal PUE receiving a strong interference from the radio base station eNB. When the deteriorated radio terminal PUE is detected by the deteriorated terminal detector 151, the process proceeds to step S302.

At step S302, the notification request generator 152 of the picocell base station PeNB generates a PDCCH notification request message for requesting the transmission of the PDCCH notification message. The PDCCH notification request message at least contains a source base station ID to identify the picocell base station PeNB. In addition to the source ID, the PDCCH notification request message may contain information indicating the number of deteriorated radio terminals PUE detected by the deteriorated terminal detector 151 and information indicating a degree of interference received by the deteriorated radio terminal PUE detected by the deteriorated terminal detector 151 (i.e., the deterioration degree of the receiving quality). Also, the PDCCH notification request message may contain a destination base station ID to identify the radio base station eNB of the interference source. The information indicating the interference degree and the destination base station ID can be set based on the reception quality information. The PDCCH notification request message is assumed below to contain the source ID, the information indicating the number of deteriorated ratio terminals PUE, and the information indicating the interference degree.

At step S303, the X2 interface communication unit 140 of the picocell base station PeNB transmits the PDCCH notification request message generated by the notification request generator 152 to each neighboring base station eNB. The X2 interface communication unit 140 may transmit the PDCCH notification request message only to the neighboring base station eNB shown by the destination ID contained in the PDCCH notification request message.

The X2 interface communication unit 240 of the macrocell base station MeNB receives the PDCCH notification request message.

At step S304, the target subframe determination unit 251 of the macrocell base station MeNB interprets the PDCCH notification request message which is received by the X2 interface communication unit 240 and determines a limitation target subframe in which the PDCCH usage is to be limited to an upper limit value or below among the 10 subframes corresponding to one radio frame. The target subframe determination unit 251 may determine the limitation target subframe according to the information indicating the number of the deteriorated radio terminals PUE, which is contained in the PDCCH notification request message. For example, the target subframe determination unit 251 increases the number of limitation target subframes as the number of the deteriorated radio terminals PUE is larger, and decreases the number of limitation target subframes as the number of the deteriorated radio terminals PUE is smaller. However, when the PDCCH notification request message is being received from another picocell base station PeNBx (not shown), the target subframe determination unit 251 determines a limitation target subframe in consideration of the contents of the PDCCH notification request message from another picocell base station PeNBx.

In addition, at step S304, the upper limit value determination unit 252 of the macrocell base station MeNB interprets the PDCCH notification request message received by the X2 interface communication unit 240 and determines an upper limit value of the PDCCH usage in the limitation target subframe. The upper limit value determination unit 252 may determines an upper limit value according to the information indicating the interference degree, which is contained in the PDCCH notification request message. For example, the upper limit value determination unit 252 decreases the upper limit value as the interference degree is larger and increases the upper limit value as the interference degree is smaller. However, when the PDCCH notification request message is being received from another picocell base station PeNBx, the upper limit value determination unit 252 determines an upper limit value in consideration of the contents of the PDCCH notification request message from another picocell base station PeNBx.

At step S305, the PDSCH linked-control determination unit 253 of the macrocell base station MeNB determines whether to make the linked-control of the PDSCH usage in the limitation target subframe determined by the target subframe determination unit 251. The PDSCH linked-control determination unit 253 uses the upper limit value of the PDCCH usage, which is determined by the upper limit value determination unit 252 as a reference for determining the on/off of the linked-control. When the upper limit value of the PDCCH usage is low, PDSCH can be allocated to only a small number of radio terminals UE in the limitation target subframe, which decreases a scheduling gain. Accordingly, when the upper limit value of the PDCCH usage is lower than a predetermined threshold, the PDSCH linked-control determination unit 253 determines to make the linked-control of the PDSCH usage in the limitation target subframe for decreasing the PDSCH allocation in the limitation target subframe.

At step S306, the PDCCH notification generator 254 generates a PDCCH notification message based on the target subframe determined by the target subframe determination unit 251, the upper limit value determined by the upper limit value determination unit 252, and the on/off of the linked-control determined by the PDSCH linked-control determination unit 253. In addition to the source base station ID to identify the macrocell base station MeNB, the PDCCH notification message contains (a) an information element indicating the limitation target subframe in one radio frame, (b) an information element indicating the upper limit value of the PDCCH usage in the limitation target subframe, and (c) an information element indicating on/off of the linked-control of the PDSCH in the limitation target subframe. However, like a case where the linked-control of the PDSCH is always "on" when the upper limit value of the PDCCH usage shows 0%, the information element of (c) may be indicated by using the information element of (b). Also, the PDCCH notification message may contain a destination base station ID. Specifically, the source base station ID of the PDCCH notification request message can be set as a destination base station ID of the PDCCH notification message. Or, the PDCCH notification message may be broadcasted to all the neighboring base stations eNB around the macrocell base station MeNB. In doing so, all the neighboring base stations eNB having received the PDCCH notification message can know the PDCCH usage state of the macrocell base station MeNB and can utilize it for the PDCCH allocation in each neighboring base station eNB.

At step S307, the X2 interface communication unit 240 of the macrocell base station MeNB transmits the PDCCH notification message generated by the PDCCH notification generator 254.

The X2 interface communication unit 140 of the picocell base station PeNB receives the PDCCH notification message.

At step S308, the allocation condition determination unit 153 of the picocell base station PeNB determines a subframe whose PDCCH and PDSCH are allocated to the deteriorated radio terminal PUE based on (a) the information element indicating the limitation target subframe in one radio frame, (b) the information element indicating the upper limit value of the PDCCH usage in the limitation target subframe, and (c) the information element indicating on/off of the linked-control of the PDSCH in the limitation target subframe, which are contained in the PDCCH notification message received by the X2 interface communication unit 140. The allocation condition determination unit 153 determines the limitation target subframe shown by the information element of (a) as a subframe whose PDCCH and PDSCH are allocated to the deteriorated radio terminal PUE. In addition, the allocation condition determination unit 153 may determine to increase the PDCCH resource usage in the limitation target subframe as the upper limit value indicated by the information element of (b) becomes lower. In addition, the allocation condition determination unit 153 may determine to increase the PDSCH resource usage in the limitation target subframe when the information element of (c) indicates that the linked-control of the PDSCH is "on."

Note that the processes at step S304 to S307 may be repeatedly executed for each radio frame (10 subframes) until the picocell base station PeNB transmits a transmission stop request for the PDCCH notification message to the macrocell base station MeNB. In this case, the picocell base station PeNB preferably transmits the transmission stop request for the PDCCH notification message to the macrocell base station MeNB when the deteriorated radio terminal PUE becomes undetectable.

Or, the picocell base station PeNB may transmit information indicating the number of repeated executions of the processes at step S304 to S307 with the information contained in the PDCCH notification request. In this case, the macrocell base station MeNB repeatedly executes the processes at step S304 to S307 by the number of times according to the information indicating the number of repeated executions contained in the PDCCH notification request.

Note that, although in the present operational sequence, the PDCCH notification message is transmitted from the macrocell base station MeNB to the picocell base station PeNB, the PDCCH notification message may be transmitted from the picocell base station MeNB to the macrocell base station PeNB.

(5) Effects of Third Embodiment

The third embodiment can suppress the PDCCH interference between the radio base stations as similar to the first embodiment. Also, the PDSCH usage is linked to the PDCCH usage, so that the PDSCH interference between radio base stations can be also suppressed.

Note that the third embodiment describes an example of an interference control technique in the heterogeneous network. However, the interference control technique according to the third embodiment is applicable to the PDCCH interference between macrocell base stations as described in the second embodiment.

Fourth Embodiment

Hereinafter, a fourth embodiment of the disclosure is described. The fourth embodiment is an embodiment in which the first embodiment and the third embodiment are combined. A macrocell base station MeNB according to the fourth embodiment is configured as similar as that of the third embodiment. In the fourth embodiment, the description is given in the following order of (1) Configuration of Picocell Base Station, (2) Operational Example of Radio Communication System, (3) and Effects of Fourth Embodiment. Also, portions different from those of the first and third embodiments are mainly described, and the duplicated description is omitted.

(1) Configuration of Picocell Base Station

Figure 14:
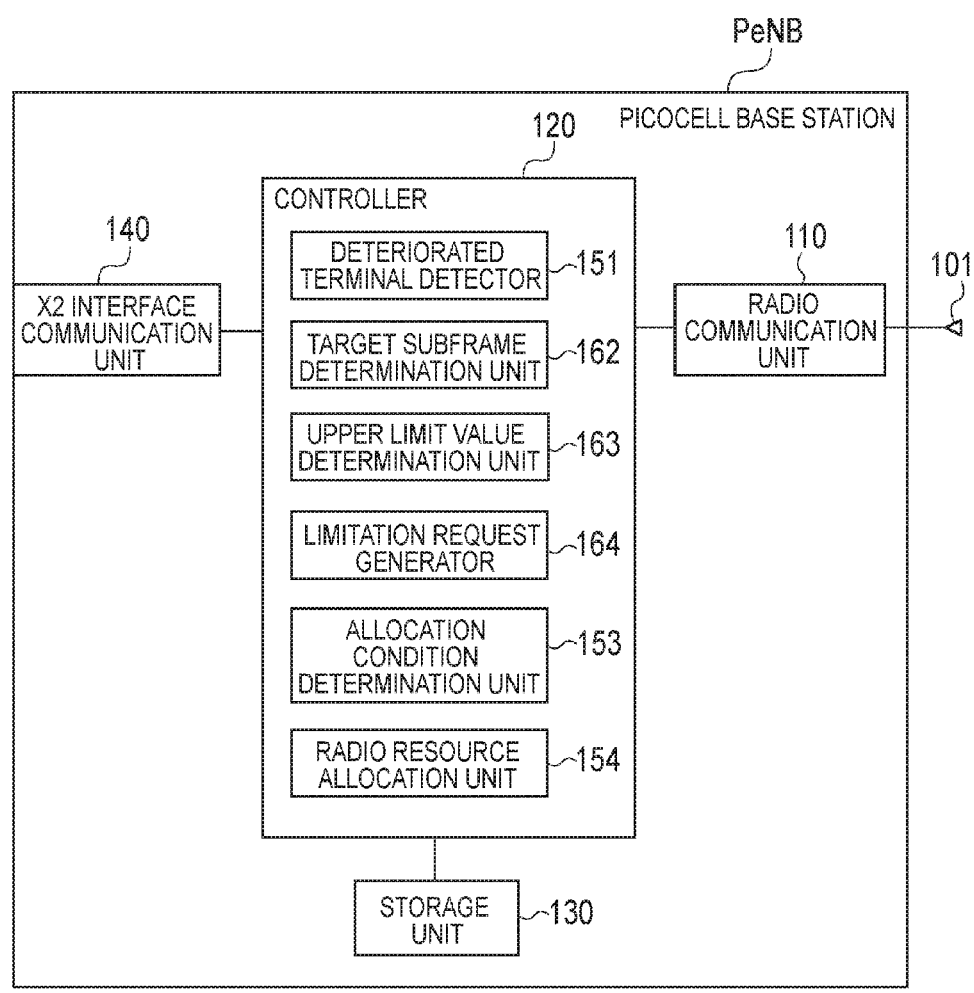
FIG. 14 is a block diagram showing the configuration of a picocell base station according to the fourth embodiment.

FIG. 14 is a block diagram showing the configuration of a picocell base station PeNB according to the fourth embodiment. As shown in FIG. 14, a picocell base station PeNB according to the fourth embodiment is different from that of the first embodiment in the configuration of a controller 120.

The controller 120 has a deteriorated terminal detector 151, a target subframe determination unit 162, an upper limit value determination unit 163, a limitation request generator 164, an allocation condition determination unit 153, and a radio resource allocation unit 154. The deteriorated terminal detector 151, the allocation condition determination unit 153, and the radio resource allocation unit 154 have configurations same as those of the third embodiment.

The target subframe determination unit 162 determines a limitation target subframe in which a PDCCH usage of the macrocell base station MeNB should be limited to the upper limit value or below among 10 subframes corresponding to one radio frame.

The upper limit value determination unit 163 determines the upper limit value of the PDCCH usage of the macrocell base station MeNB in the limitation target subframe determined by the target subframe determination unit 162.

The limitation request generator 164 generates a PDCCH limitation request message based on the target subframe determined by the target subframe determination unit 162 and the upper limit value determined by the upper limit value determination unit 163. The PDCCH limitation request message contains (a) an information element indicating a limitation target subframe in one radio frame and (b) an information element indicating an upper limit value of the PDCCH usage of the macrocell base station MeNB in the limitation target subframe, in addition to a source base station ID to identify the picocell base station PeNB and a destination base station ID to identify the interference source radio base station eNB (the macrocell base station MeNB).

The PDCCH limitation request message can have a configuration in which a field storing the information element indicating on/off of the linked-control of the PDSCH is excluded from a message format of the PDCCH notification message described in the third embodiment.

(2) Operational Example of Radio Communication System

Figure 15:
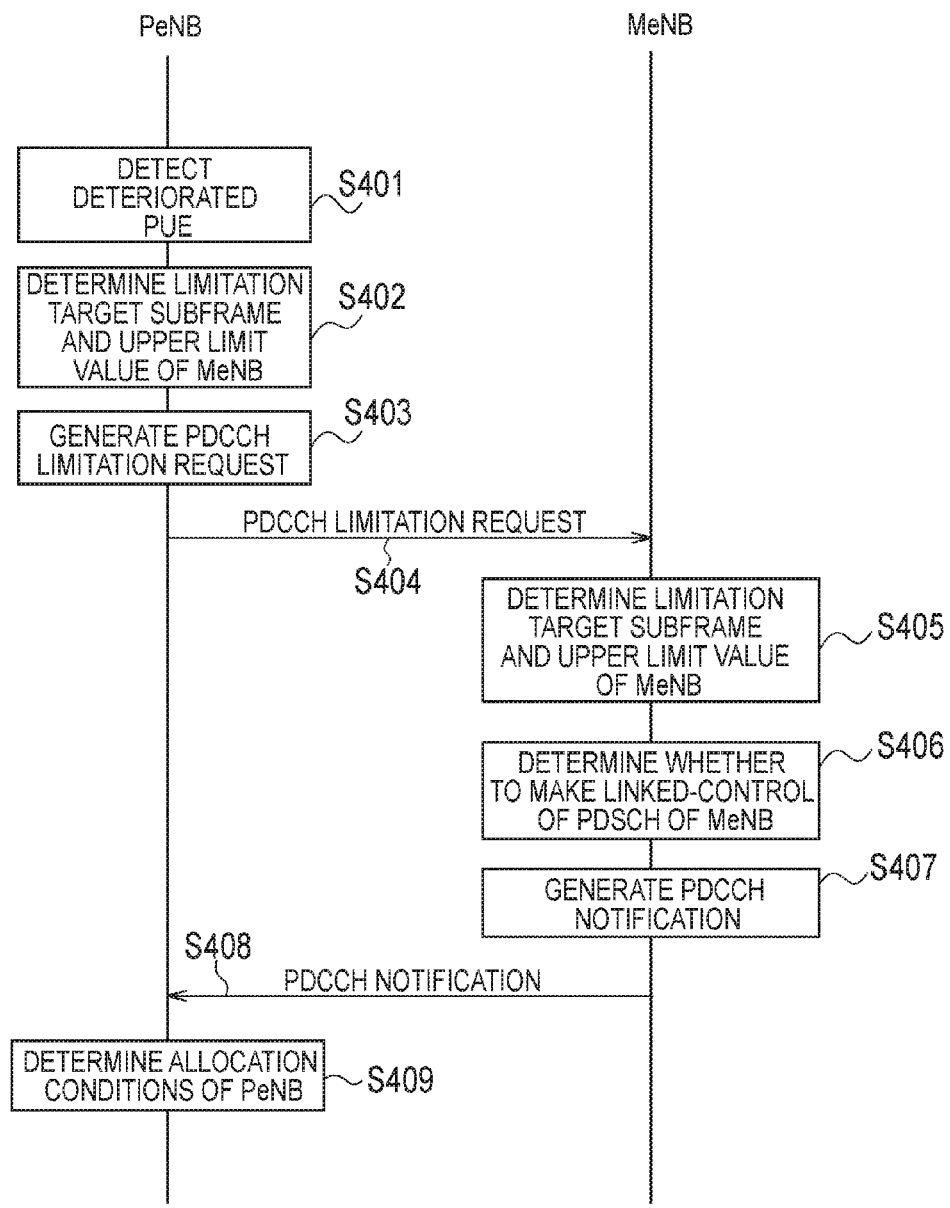
FIG. 15 is an operational sequence diagram showing an operational example of the radio communication system according to the fourth embodiment.

FIG. 15 is an operational sequence diagram showing an operational example of a radio communication system 1A according to the fourth embodiment.

At step S401, the deteriorated terminal detector 151 of the picocell base station PeNB detects a deteriorated radio terminal PUE whose receiving quality is deteriorated due to a strong interference based on reception quality information (such as a measurement report or CQI) reported from each radio terminal PUE connecting with the picocell base station PeNB. When the deteriorated radio terminal PUE is detected by the deteriorated terminal detector 151, the process proceeds to step S402.

At step S402, the target subframe determination unit 162 of the picocell base station PeNB determines a limitation target subframe in which a PDCCH usage of the macrocell base station MeNB should be limited to the upper limit value or below among the 10 subframes corresponding to one radio frame. The target subframe determination unit 162 may determine a limitation target subframe according to the number of deteriorated radio terminals PUE which are detected by the deteriorated terminal detector 151. For example, the target subframe determination unit 162 increases the number of limitation target subframes as the number of the deteriorated radio terminals PUE becomes larger, and decreases the number of limitation target subframes as the number of the deteriorated radio terminals PUE becomes smaller.

At step S403, the upper limit value determination unit 163 of the picocell base station PeNB determines the upper limit value of the PDCCH usage of the macrocell base station MeNB in the limitation target subframe determined by the target subframe determination unit 162. The upper limit value determination unit 163 may determine an upper limit value according to an interference degree (i.e., the degree of receiving quality deterioration) with respect to the deteriorated radio terminal PUE detected by the deteriorated terminal detector 151. For example, the upper limit value determination unit 163 decreases the upper limit value as the interference degree is larger and increases the upper limit value as the interference degree is smaller.

At step S403, the limitation request generator 164 of the picocell base station PeNB generates a PDCCH limitation request message based on the target subframe determined by the target subframe determination unit 162 and the upper limit value determined by the upper limit value determination unit 163. The PDCCH limitation request message contains (a) an information element indicating a limitation target subframe in one radio frame and (b) an information element indicating an upper limit value of the PDCCH usage in the limitation target subframe, in addition to a source base station ID to identify the picocell base station PeNB and a destination base station ID to identify the interference source radio base station eNB (the macrocell base station MeNB).

At step S404, the X2 interface communication unit 140 of the picocell base station PeNB transmits the PDCCH limitation request message generated by the limitation request generator 164 to the interference source radio base station eNB (the macrocell base station MeNB).

The X2 interface communication unit 240 of the macrocell base station MeNB receives the PDCCH limitation request message.

At step S405, the target subframe determination unit 251 of the macrocell base station MeNB determines a limitation target subframe in which the PDCCH usage should be limited to the upper limit value or below among the 10 subframes corresponding to one radio frame, according to the information element of (a) contained in the PDCCH limitation request message received by the X2 interface communication unit 240. When the PDCCH limitation request message is being received from another picocell base station PeNBx, the target subframe determination unit 251 determines a limitation target subframe in consideration of the contents of the PDCCH limitation request message from another picocell base station PeNBx.

In addition, at step S405, the upper limit value determination unit 252 of the macrocell base station MeNB determines the above-described upper limit value according to the information element of (b) contained in the PDCCH limitation request message received by the X2 interface communication unit 240. When the PDCCH limitation request message is also being received from another picocell base station PeNBx, the upper limit value determination unit 252 determines an upper limit value in consideration of the contents of the PDCCH limitation request message from another picocell base station PeNB.

At step S406, the PDSCH linked-control determination unit 253 of the macrocell base station MeNB determines whether to make the linked-control of the PDSCH usage in the limitation target subframe whose PDCCH usage is determined to be limited to the upper limit value or below. The PDSCH linked-control determination unit 253 uses the upper limit value of the PDCCH usage, which is determined by the upper limit value determination unit 252 as a reference for determining the on/off of the linked-control. When the upper limit value of the PDCCH usage is lower than a predetermined threshold, the PDSCH linked-control determination unit 253 determines to make the linked-control of the PDSCH usage in the limitation target subframe for decreasing the PDSCH allocation in the limitation target subframe.

At step S407, the PDCCH notification generator 254 generates a PDCCH notification message based on a target subframe determined by the target subframe determination unit 251, the upper limit value determined by the upper limit value determination unit 252, and the on/off of the linked-control determined by the PDSCH linked-control determination unit 253. The specific creation method is similar to step S306 in the third embodiment.

At step S408, the X2 interface communication unit 240 of the macrocell base station MeNB transmits the PDCCH notification message generated by the PDCCH notification generator 254.

The X2 interface communication unit 140 of the picocell base station PeNB receives the PDCCH notification message.

At step S409, the allocation condition determination unit 153 of the picocell base station PeNB determines a subframe whose PDCCH and PDSCH are allocated to the deteriorated radio terminal PUE based on (a) the information element indicating the limitation target subframe in one radio frame, (b) the information element indicating the upper limit value of the PDCCH usage in the limitation target subframe, and (c) the information element indicating on/off of the linked-control of the PDSCH in the limitation target subframe, which are contained in the PDCCH notification message received by the X2 interface communication unit 140. The specific determination method is similar to step S308 in the third embodiment.

Note that, although in the present operational sequence, the PDCCH limitation request message is transmitted from the picocell base station MeNB to the macrocell base station PeNB, the PDCCH limitation request message may be transmitted from the macrocell base station MeNB to the picocell base station PeNB.

(3) Effects of Fourth Embodiment

The fourth embodiment can suppress the PDCCH interference between the radio base stations as similar to the first embodiment. Also, the PDSCH usage is linked to the PDCCH usage, so that the PDSCH interference between radio base stations can be suppressed. Note that the fourth embodiment describes the example of the interference control technique in the heterogeneous network. However, the interference control technique according to the fourth embodiment is applicable to the PDCCH interference between macrocell base stations as described in the second embodiment.

Fifth Embodiment

Hereinafter, a fifth embodiment of the disclosure is described. The fifth embodiment is an embodiment in which the third embodiment is modified. A macrocell base station MeNB according to the fifth embodiment is configured as similar as that of the third embodiment. In the fifth embodiment, the description is given in the following order of (1) Configuration of Picocell Base Station, (2) Operational Example of Radio Communication System, (3) and Effects of Fifth Embodiment. Also, portions different from those of the first, third and fifth embodiments are mainly described, and the duplicated description is omitted.

(1) Configuration of Picocell Base Station

Figure 16:
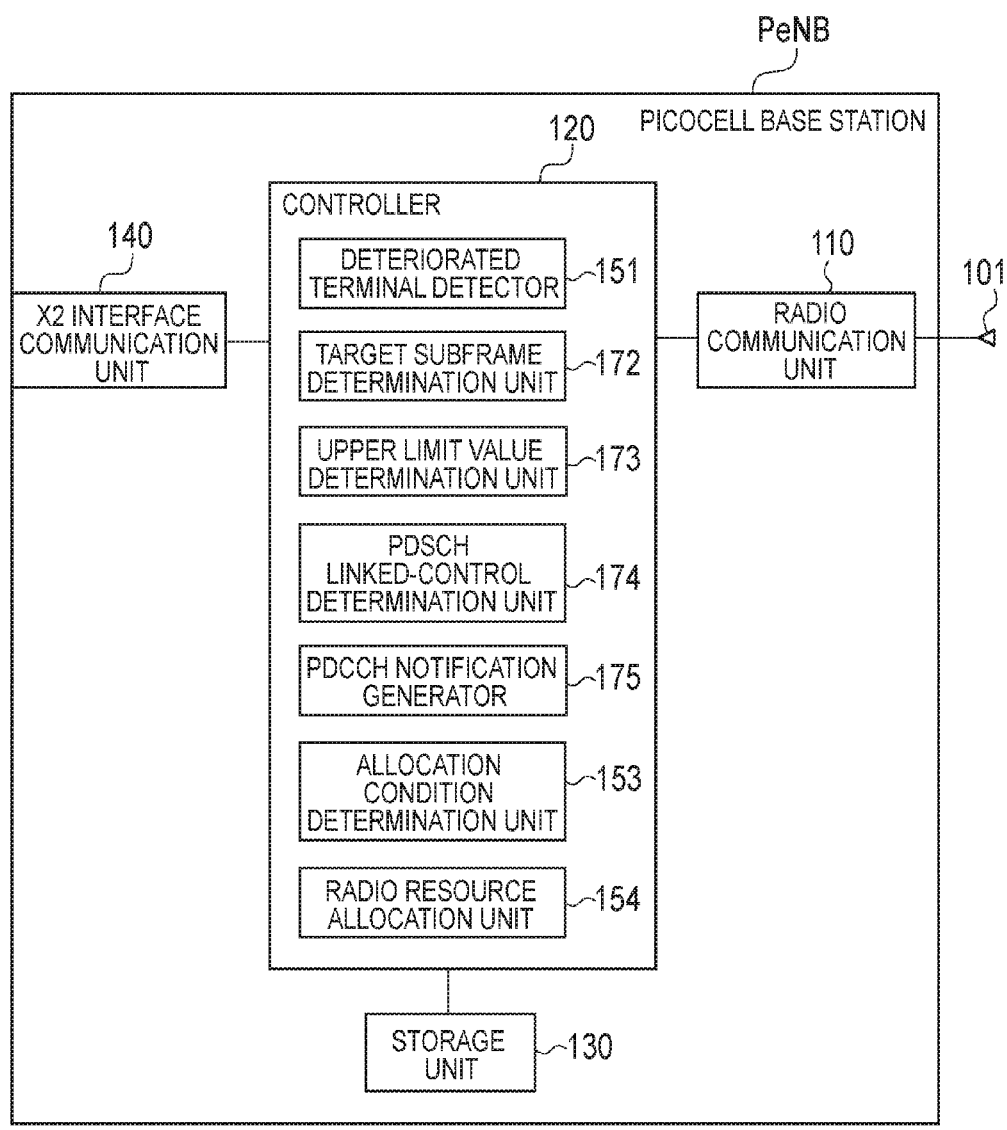
FIG. 16 is a block diagram showing the configuration of a picocell base station according to the fifth embodiment.

FIG. 16 is a block diagram showing the configuration of a picocell base station PeNB according to a fifth embodiment. As shown in FIG. 16, a picocell base station PeNB according to the fifth embodiment is different from that of the first embodiment in the configuration of a controller 120.

The controller 120 has a deteriorated terminal detector 151, a target subframe determination unit 172, an upper limit value determination unit 173, a PDSCH linked-control determination unit 174, a PDCCH notification generator 175, an allocation condition determination unit 153, and a radio resource allocation unit 154.

The deteriorated terminal detector 151, the allocation condition determination unit 153, and the radio resource allocation unit 154 have configurations same as those of the third embodiment.

The target subframe determination unit 172 determines a limitation target subframe in which a PDCCH usage of the picocell base station PeNB is to be limited to an upper limit value or below among 10 subframes corresponding to one radio frame.

The upper limit value determination unit 173 determines the upper limit value of the PDCCH usage in the limitation target subframe.

The PDSCH linked-control determination unit 174 determines whether to make the linked-control of the PDSCH usage of the picocell base station PeNB in the limitation target subframe determined by the target subframe determination unit 172.

The PDCCH notification generator 175 generates a PDCCH notification message based on the limitation target subframe determined by the target subframe determination unit 172, the upper limit value determined by the upper limit value determination unit 173, and the on/off of the linked-control determined by the PDSCH linked-control determination unit 174.

(2) Operational Example of Radio Communication System

FIG. 17 is an operational sequence diagram showing an operational example of a radio communication system 1A according to the fifth embodiment.

At step S501, the deteriorated terminal detector 151 of the picocell base station PeNB detects a deteriorated radio terminal PUE whose receiving quality is deteriorated due to a strong interference based on reception quality information (such as a measurement report or CQI) reported from each radio terminal PUE connecting with the picocell base station PeNB. When the deteriorated radio terminal PUE is detected by the deteriorated terminal detector 151, the process proceeds to step S502.

At step S502, the target subframe determination unit 172 of the picocell base station PeNB determines a limitation target subframe in which the PDCCH usage of the picocell base station PeNB should be limited to the upper limit value or below among 10 subframes corresponding to one radio frame based on the information on the deteriorated radio terminal PUE. The target subframe determination unit 172 may determine a limitation target subframe according to the number of deteriorated radio terminals PUE. For example, the target subframe determination unit 172 decreases the number of limitation target subframes as the number of the deteriorated radio terminals PUE is larger, and increases the number of limitation target subframes as the number of the deteriorated radio terminals PUE is smaller.

Also, at step S503, the upper limit value determination unit 173 of the picocell base station PeNB determines an upper limit value of the PDCCH usage of the picocell base station PeNB in the limitation target subframe based on the information on the deteriorated radio terminal PUE. The upper limit value determination unit 173 may determine an upper limit value of the deteriorated radio terminal PUE according to an interference degree. For example, the upper limit value determination unit 173 decreases the upper limit value as the interference degree becomes larger and increases the upper limit value as the interference degree becomes smaller.

At step S503, the PDSCH linked-control determination unit 174 of the picocell base station PeNB determines whether to make the linked-control of the PDSCH usage of the picocell base station PeNB in the limitation target subframe determined by the target subframe determination unit 172. The PDSCH linked-control determination unit 174 uses the upper limit value of the PDCCH usage, which is determined by the upper limit value determination unit 173, as a reference for determining the on/off of the linked-control. When the upper limit value of the PDCCH usage is low, the PDSCH can be allocated to only a small number of radio terminals PUE in the limitation target subframe, which decreases a scheduling gain. Accordingly, when the upper limit value of the PDCCH usage of the picocell base station PeNB is lower than the predetermined threshold, the PDSCH linked-control determination unit 174 determines to make the linked-control of the PDSCH usage of the picocell base station PeNB in the limitation target subframe for decreasing the PDSCH allocation of the picocell base station PeNB in the limitation target subframe.

At step S504, the PDCCH notification generator 175 generates a PDCCH notification message based on the target subframe determined by the target subframe determination unit 172, the upper limit value determined by the upper limit value determination unit 173, and the on/off of the linked-control determined by the PDSCH linked-control determination unit 174. The PDCCH notification message contains (a) an information element indicating the limitation target subframe in one radio frame, (b) an information element indicating the upper limit value of the PDCCH usage in the limitation target subframe, and (c) an information element indicating on/off of the linked-control of the PDSCH in the limitation target subframe, in addition to a source base station ID to identify the picocell base station PeNB. However, like a case where the linked-control of the PDSCH is always on when the upper limit value of the PDCCH usage is 0%, the information element of (c) may be indicated by using the information element of (b). Also, the PDCCH notification message may contain a destination base station ID. Instead, the PDCCH notification message may be broadcasted to all the neighboring base stations eNB around the picocell base station MeNB. Accordingly, all the neighboring base stations eNB which have received the PDCCH notification message can know the PDCCH usage state of the picocell base station PeNB.

At step S505, the X2 interface communication unit 140 of the picocell base station PeNB transmits the PDCCH notification message generated by the PDCCH notification generator 175.

The X2 interface communication unit 240 of the macrocell base station MeNB receives the PDCCH notification message.

At step S506, the target subframe determination unit 251 of the macrocell base station MeNB interprets the PDCCH notification message which is received by the X2 interface communication unit 240 and determines a limitation target subframe in which the PDCCH usage should be to the upper limit value or below among the 10 subframes corresponding to one radio frame. The target subframe determination unit 251 may determines a limitation target subframe according to (a) an information element indicating a limitation target subframe in one radio frame and (b) an information element indicating an upper limit value of the PDCCH usage in the limitation target subframe, included in the PDCCH notification message. For example, the target subframe determination unit 251 recognizes that a subframe whose PDCCH usage is not limited to the upper limit value or below by the picocell base station PeNB is allocated to a cell edge terminal (a deteriorated radio terminal PUE) of the picocell base station PeNB, and determines the subframe as a limitation target subframe whose PDCCH usage of its own base station (macrocell base station MeNB) should be limited to the upper limit value or below.

In addition, at step S506, the upper limit value determination unit 252 of the macrocell base station MeNB interprets the PDCCH notification message received by the X2 interface communication unit 240 and determines an upper limit value of the PDCCH usage in the limitation target subframe. The upper limit value determination unit 252 may determine its own upper limit value according to (b) the information indicating the upper limit value of the PDCCH usage in the limitation target subframe contained in the PDCCH notification message. For example, the upper limit value determination unit 252 determines the upper limit value of the PDCCH usage of its own base station (of the macrocell base station MeNB) to be the upper limit value of the PDCCH usage of the picocell base station PeNB. Or, the upper limit value determination unit 252 may determine whether or not a target is a picocell base station PeNB and determine the upper limit value of its own base station to be an upper limit value which is predetermined for the picocell base station PeNB.

At step S507, the PDSCH linked-control determination unit 253 of the macrocell base station MeNB determines whether to make the linked-control of the PDSCH usage in the limitation target subframe determined by the target subframe determination unit 251. The PDSCH linked-control determination unit 253 uses the upper limit value of the PDCCH usage, which is determined by the upper limit value determination unit 252, as a reference for determining the on/off of the linked-control. When the upper limit value of the PDCCH usage is low, the PDSCH can be allocated to only a small number of radio terminals UE in the limitation target subframe becomes smaller, which decreases a scheduling gain. Accordingly, when the upper limit value of the PDCCH usage is lower than the predetermined threshold, the PDSCH linked-control determination unit 253 determines to make the linked-control of the PDSCH usage in the limitation target subframe for decreasing the PDSCH allocation in the limitation target subframe.

At step S508, the PDCCH notification generator 254 generates a PDCCH notification message based on the target subframe determined by the target subframe determination unit 251, the upper limit value determined by the upper limit value determination unit 252, and the on/off of the linked-control determined by the PDSCH linked-control determination unit 253. The PDCCH notification message contains (a) an information element indicating the limitation target subframe of the macrocell base station MeNB in one radio frame, (b) an information element indicating its own upper limit value of the PDCCH usage in the limitation target subframe, and (c) an information element indicating on/off of the linked-control of the PDSCH of the macrocell base station MeNB in the limitation target subframe, in addition to a source base station ID to identify the macrocell base station MeNB. However, like a case where the linked-control of the PDSCH is always on when the upper limit value of the PDCCH usage is 0%, the information element of (c) may be indicated by using the information element of (b). Also, the PDCCH notification message may contain a destination base station ID. Specifically, the source base station ID of the PDCCH notification message received by the macrocell base station MeNB can be set as a destination base station ID of the PDCCH notification message to be transmitted by the macrocell base station MeNB. Or, the PDCCH notification message may be broadcasted to all the neighboring base stations eNB around the macrocell base station MeNB.

At step S509, the X2 interface communication unit 240 of the macrocell base station MeNB transmits the PDCCH notification message generated by the PDCCH notification generator 254.

The X2 interface communication unit 140 of the picocell base station PeNB receives the PDCCH notification message.

At step S510, the allocation condition determination unit 153 of the picocell base station PeNB determines a subframe whose PDCCH and PDSCH are allocated to the deteriorated radio terminal PUE based on (a) the information element indicating the limitation target subframe in one radio frame, (b) the information element indicating the upper limit value of the PDCCH usage in the limitation target subframe, and (c) the information element indicating on/off of the linked-control of the PDSCH in the limitation target subframe, which are contained in the PDCCH notification message received by the X2 interface communication unit 140. The allocation condition determination unit 153 determines a limitation target subframe shown by the information element of (a) as a subframe whose PDCCH and PDSCH are allocated to the deteriorated radio terminal PUE. In addition, the allocation condition determination unit 153 may determine to increase the PDCCH resource usage in the limitation target subframe as the upper limit value indicated by the information element of the allocation condition determination unit 153 becomes lower. In addition, the allocation condition determination unit 153 may determine to increase the PDCCH resource usage in the limitation target subframe when the information element of (c) indicates that the linked-control of the PDSCH is "on."

(3) Effects of Fifth Embodiment

The fifth embodiment can suppress the PDCCH interference between the radio base stations as similar to the first embodiment. Also, the PDSCH usage is linked to the PDCCH usage, so that the PDSCH interference between radio base stations can be also suppressed. Note that the fifth embodiment describes an example of the interference control technique in the heterogeneous network. However, the interference control technique according to the fifth embodiment is applicable to the PDCCH interference between macrocell base stations as described in the second embodiment.

Sixth Embodiment

Although each of the above-described embodiments mainly describes a suppression of interference which is received by the PDCCH of the picocell base station PeNB from the PDCCH of the macrocell base station MeNB, the PDCCH of the picocell base station PeNB may receive an interference not only from the PDCCH of the macrocell base station MeNB but also the PDSCH of the macrocell base station MeNB. A sixth embodiment is an embodiment which also considers an interference which is received by a PDCCH of a picocell base station PeNB from a PDSCH of a macrocell base station MeNB.

FIG. 18 is a drawing for illustrating an interference state of the PDCCH of the picocell base station PeNB. As shown in FIG. 18, when a PDCCH domain (a control region) of the picocell base station PeNB is for 3 symbols from the head of subframes and a PDCCH domain of the macrocell base station MeNB is for 2 symbols from the head of subframes, the PDCCH domain for the third symbol of the picocell base station PeNB receives an interference from a PDSCH domain (a data region) of the macrocell base station MeNB. In this case, to reduce the interference received by the PDCCH of the picocell base station PeNB, a PDSCH usage rate of the macrocell base station MeNB has to be considered.

In the case where a PDCCH limitation is requested from the picocell base station PeNB to the macrocell base station MeNB as in above-described third and fourth embodiments, the PDSCH usage rate of the macrocell base station MeNB can be considered by adding the following changes. As shown in FIG. 19, in the present modification, the picocell base station PeNB includes information indicating the number of symbols within a time range of the PDCCH domain (the control region) of the picocell base station PeNB (the PDCCH symbol number information) and information indicating a radio resource usage rate to be used as an upper limit by the macrocell base station MeNB within the time range (the upper limit value information). The macrocell base station MeNB having received this message controls the usage rate of radio resource (PDCCH resource and PDSCH resource) corresponding to the time range of the PDCCH domain of the picocell base station PeNB in the limitation target subframe designated by this message.

In addition, in the case where PDCCH is notified from the picocell base station PeNB to the macrocell base station MeNB as in the above-described fifth embodiment, the PDSCH usage rate of the macrocell base station MeNB can be also considered by adding the following changes. As shown in FIG. 19, in the present modification, the picocell base station PeNB includes information indicating the number of symbols within a time range of the PDCCH domain (the control region) of the picocell base station PeNB (PDCCH symbol number information) and information indicating a radio resource usage rate to be used as an upper limit by the picocell base station PeNB within the time range (the upper limit value information). The macrocell base station MeNB having received this message controls the usage rate of radio resource (PDCCH resource and PDSCH resource) corresponding to the time range of the PDCCH domain of the picocell base station PeNB in a subframe other than the limitation target subframe designated by this message.

Note that the PDCCH notification message from the macrocell base station MeNB to the picocell base station PeNB preferably can notify whether the macrocell base station MeNB limits the radio resource usage rate for the number of symbols (the time range) according to the notification from the picocell base station PeNB. Accordingly, the macrocell base station MeNB may transmit information indicating the number of symbols within the time range in which the radio resource usage rate is limited (the limitation symbol number information) to the picocell base station PeNB with the information being contained in the PDCCH notification message, in addition to the information indicating the number of symbols within the time range of the PDCCH domain (the control region) of the macrocell base station MeNB (the PDCCH symbol number information) and the information indicating the radio resource usage rate to be used as an upper limit by the macrocell base station MeNB within the time range (the upper limit value information). In the example of FIG. 19, the macrocell base station MeNB notifies "2" symbols as the PDCCH symbol number information and "3" symbols as the limitation symbol number information.

Similarly, the limitation symbol number information may be employed as the PDCCH notification message from the picocell base station PeNB to the macrocell base station MeNB. In the example of FIG. 19, the picocell base station PeNB notifies "3" symbols as both the PDCCH symbol number information and the limitation symbol number information.

Seventh Embodiment

Hereinafter, a seventh embodiment of the disclosure is described. Described in the seventh embodiment is an interference control technique applied to a radio communication system of a heterogeneous network same as that of FIG. 3.

In the above-described embodiments, the picocell base station PeNB and the macrocell base station MeNB each determine whether its own PDCCH usage (PDCCH usage rate) is linked to its own PDSCH usage (PDSCH usage rate) in a limitation target subframe of the base station itself, and notify each other of information indicating on/off of the linked-control of the PDSCH.

On the other hand, in the present embodiment, in place of the information indicating on/off of the linked-control of the PDSCH, information referred to as RNTP (Relative Narrowband Tx Power) is used. The RNTP is information indicating whether downlink transmission power is limited to a RNTP threshold or below for each resource block (RB). The RNTP contains a string of bits associated with respective RBs and the RNTP threshold. For example, when a RB whose transmission power is limited the RNTP threshold or below is "0" and a RB whose transmission power is not limited to the RNTP threshold or below is "1," the bit string associated with RBs is configured like "10100 . . . " with each RB represented by the position of a bit.

The description of the seventh embodiment is given in the order of (1) Summary of Seventh Embodiment and (2) Details of Seventh Embodiment. Note that portions different from those of the first embodiment to the sixth embodiment are described, and the duplicated description is omitted.

(1) Summary of Seventh Embodiment

A first characteristic according to a seventh embodiment is that a radio base station includes a transmitter configured to transmit transmission power information to a neighboring base station through inter-base station communication when the radio base station performs downlink communication with a radio terminal by using a communication frame configuration in which subframes are arranged in a time direction are divided by time into a control region and a time domain. Specifically, for a limitation target subframe where a downlink control channel usage or a downlink control channel usage rate is limited, when the radio base station limits the downlink transmission power for all the frequency bands in the data region to a threshold or below, the transmitter sends the transmission power information indicating that the downlink transmission power in all the frequency bands in the data region is limited to the threshold or below in the limitation target subframe.

Also, a second characteristic of the radio communication system according to the seventh embodiment is that the transmitter transmits information indicating the threshold together with the transmission power information in the first characteristic.

Furthermore, a third characteristic of the radio communication system according to the seventh embodiment is that the radio base station includes a transmission power controller configured to limit downlink transmission power so to the threshold or below only for part of the frequency bands in the data region in a subframe other than the limitation target subframe in the first characteristic.

In the first to third characteristics, for example, the downlink control channel means a PDCCH, the frequency band means a resource block (RB), the threshold means an RNTP threshold, the transmission power information means a bit string associated with RBs, and the inter-base station communication means communications via an X2 interface.

(2) Details of Seventh Embodiment

Hereinafter, the details of the seventh embodiment are described in the following order of (2.1) Configuration of Macrocell Base Station, (2.2) Configuration of Picocell Base Station, and (2.3) Operational Example of Radio Communication System. The configuration and operation based on the fifth embodiment is described herein but a method of the sixth embodiment may be incorporated.

(2.1) Configuration of Macrocell Base Station

Figure 20:
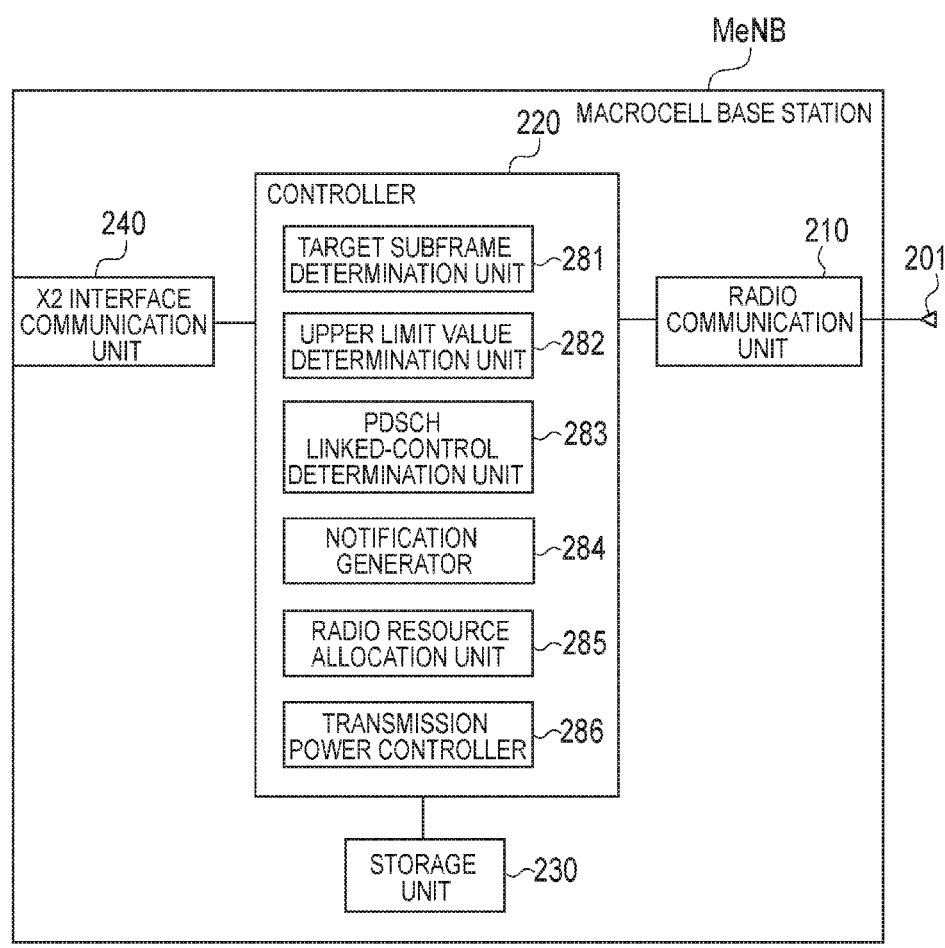
FIG. 20 is a block diagram showing the configuration of a macrocell base station according to the seventh embodiment.

FIG. 20 is a block diagram showing the configuration of a macrocell base station MeNB according to a seventh embodiment.

As shown in FIG. 20, a controller 220 of a macrocell base station MeNB according to the seventh embodiment has a target subframe determination unit 218, an upper limit value determination unit 282, a PDSCH linked-control determination unit 283, a notification generator 284, a transmission power controller 285, and a radio resource allocation unit 286.

The target subframe determination unit 281 determines a limitation target subframe in which a PDCCH usage of the macrocell base station MeNB is limited to the upper limit value or below, among multiple subframes to be used in the future. Note that the term "usage" contains the concepts of "usage rate" and "transmission power." Specifically, the usage (in other words, energy) is determined by a product of the usage rate and the transmission power.

The upper limit value determination unit 282 determines an upper limit value of the PDCCH usage in the limitation target subframe of the macrocell base station MeNB. Also, in the present embodiment, the upper limit value determination unit 282 determines a RNTP threshold according to the upper limit value of the determined PDCCH usage. Note that the upper limit value determination unit 282 may determine an RNTP threshold of the macrocell base station MeNB based on information different from the information on the upper limit value of the determined PDCCH usage.

The PDSCH linked-control determination unit 283 determines whether to make linked-control of the PDSCH usage of the macrocell base station MeNB in the limitation target subframe determined by the target subframe determination unit 281. When the linked-control of the PDSCH usage is on, the downlink transmission power of all the RBs in the limitation target subframe of the macrocell base station MeNB is limited to the RNTP threshold or below. Also, for a subframe other than the limitation target subframe of the macrocell base station MeNB (hereinafter, referred to as a non-limitation target subframe), the downlink transmission power of only part of RBs in the data region is limited to the RNTP threshold or below.

The notification generator 284 generates a notification message containing the information indicating the limitation target subframe determined by the target subframe determination unit 281, the information indicating the upper limit value determined by the upper limit value determination unit 282 and the RNTP threshold, and the RNTP information (the bit string associated with each RB).

When the linked-control of the PDSCH usage is determined to be on, the RNTP information for the limitation target subframe of the macrocell base station MeNB indicates that the downlink transmission power of all the RBs in the data region of the limitation target subframe of the macrocell base station MeNB is limited to the RNTP threshold or below. On the other hand, when the linked-control of the PDSCH usage is determined to be off, the RNTP information for each of the limitation target subframe and the non-limitation target subframe of the macrocell base station MeNB indicates that the downlink transmission power of only part of the RBs in the data region is limited to the RNTP threshold or below.

Note that the notification message may further include an ID showing a source base station (or a source cell) and an ID showing a transmission destination base station (or a transmission destination cell).

The notification generator 284 controls the X2 interface communication unit 240 so that the generated notification message is transmitted to the picocell base station PeNB. The X2 interface communication unit 240 (and the notification generator 284) configures a transmitter to transmit control information in the present embodiment.

The radio resource allocation unit 285 allocates PDCCH and PDSCH with respect to each radio terminal MUE connecting with the macrocell base station MeNB for each subframe according to the determined allocation conditions (i.e., the limitation target subframe, the upper limit value of the PDCCH usage in the limitation target subframe, and the on/off of the linked-control of the PDSCH usage in the limitation target subframe).

The radio resource allocation unit 285 controls the radio communication unit 210 so that the radio terminal MUE is notified of the allocation information for one subframe by using a PDCCH of a subframe immediately before the one subframe.

The transmission power controller 286 controls downlink transmission power of PDCCH and/or PDSCH for each radio terminal MUE connecting with the macrocell base station MeNB according to the determined transmission power conditions (i.e., the limitation target subframe, the upper limit value of the PDCCH usage in the limitation target subframe, the RNTP threshold, and the on/off of the linked-control of the PDSCH usage in the limitation target subframe).

When the linked-control of the PDSCH is on, the transmission power controller 286 limits the downlink transmission power of all the RBs in the data region in the limitation target subframe to the RNTP threshold or below. Also, when the linked-control of the PDSCH is on, the transmission power controller 286 limits the downlink transmission power to the RNTP threshold or below for only part of the RBs in the data region in the non-limitation target subframe of the macrocell base station MeNB.

On the other hand, when linked-control of the PDSCH is off, the transmission power controller 286 limits the downlink transmission power to the RNTP threshold or below for only part of the RBs in the data region in each of the limitation target subframe and the non-limitation target subframe of the macrocell base station MeNB.

(2.2) Configuration of Picocell Base Station

Figure 21:
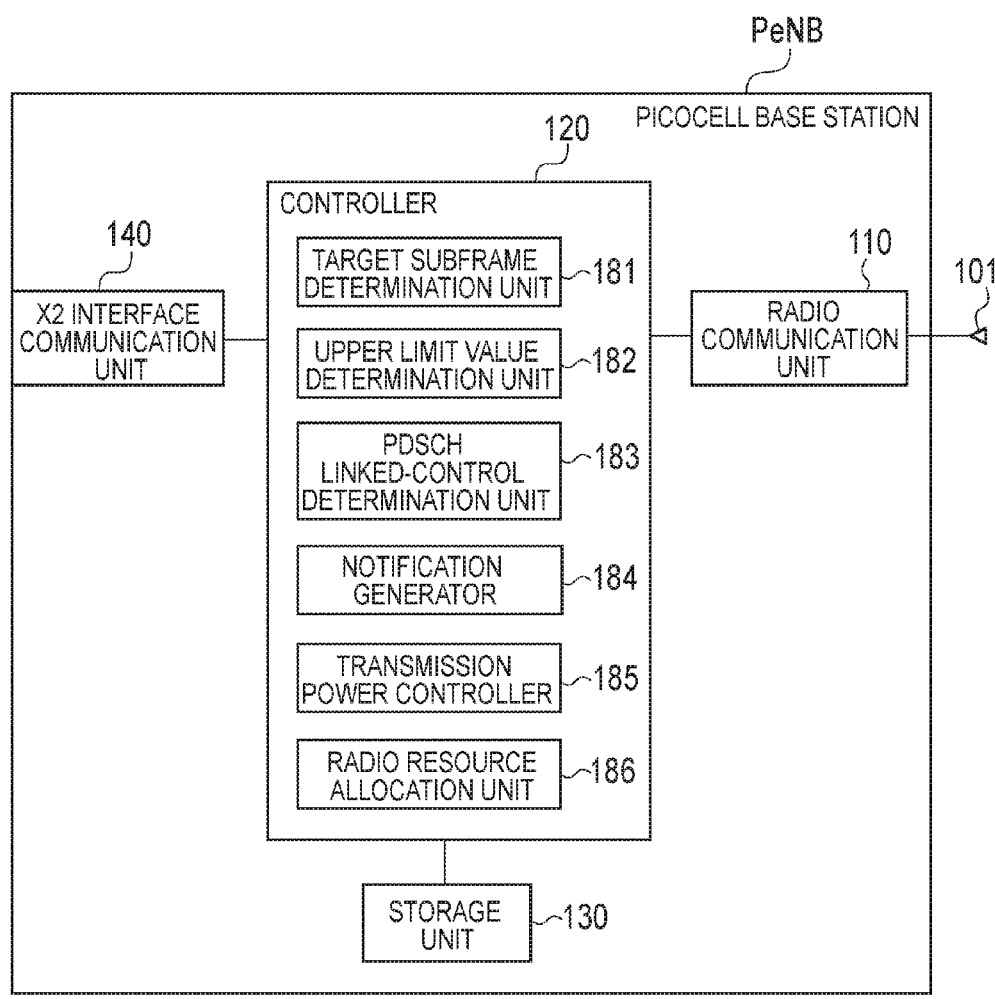
FIG. 21 is a block diagram showing the configuration of a picocell base station according to the seventh embodiment.

FIG. 21 is a block diagram showing the configuration of a picocell base station PeNB according to the seventh embodiment.

As shown in FIG. 21, the controller 120 of the picocell base station PeNB according to the seventh embodiment has a target subframe determination unit 181, an upper limit value determination unit 182, a PDSCH linked-control determination unit 183, a notification generator 184, a transmission power controller 185, and a radio resource allocation unit 186.

The target subframe determination unit 181 determines a limitation target subframe in which a PDCCH usage of the picocell base station PeNB is to be limited to the upper limit value or below among multiple subframes to be used in the future. Note that the term "usage" contains the concepts of "usage rate" and "transmission power." Specifically, the usage (in other words, energy) is determined by a product of the usage rate and the transmission power.

The target subframe determination unit 181 may use a subframe other than the limitation target subframe of the macrocell base station MeNB as a limitation target subframe of the picocell base station PeNB based on the information indicating the limitation target subframe contained in the notification message received by the X2 interface communication unit 140 from the macrocell base station MeNB.

The upper limit value determination unit 182 determines an upper limit value of the PDCCH usage in the limitation target subframe. Also, in the present embodiment, the upper limit value determination unit 182 determines an RNTP threshold according to the upper limit value of the determined PDCCH usage. Note that the upper limit value determination unit 182 may determine the RNTP threshold of the picocell base station PeNB based on information different from the information on the upper limit value of the determined PDCCH usage.

The PDSCH linked-control determination unit 183 determines whether to make the linked-control of the PDSCH usage of the picocell base station PeNB in the limitation target subframe determined by the target subframe determination unit 181. When the linked-control of the PDSCH usage is on, the downlink transmission power of all the RBs in the limitation target subframe of the picocell base station PeNB is limited to the RNTP threshold or below. Also, in the non-limitation target subframe of the picocell base station PeNB, the downlink transmission power for only part of the RBs in the data region is limited to the RNTP threshold or below.

The notification generator 184 generates a notification message containing the information indicating the limitation target subframe determined by the target subframe determination unit 181, the information indicating the upper limit value determined by the upper limit value determination unit 182 and the RNTP threshold, and the RNTP information (the bit string associated with RBs).

When the linked-control of the PDSCH usage is determined to be on, the RNTP information for the limitation target subframe indicates that the downlink transmission power is limited to the RNTP threshold or below for all the RBs in the data region of the limitation target subframe of the picocell base station PeNB. On the other hand, when the linked-control of the PDSCH usage is determined to be off, the RNTP information for each of the limitation target subframe and the non-limitation target subframe of the picocell base station PeNB indicates that the downlink transmission power is limited to the RNTP threshold or below for only part of the RBs in the data region.

Note that the notification message may further include an ID showing a source base station (or a source cell) and an ID showing a transmission destination base station (or a transmission destination cell).

The notification generator 184 controls the X2 interface communication unit 140 so that the generated notification message is transmitted to the picocell base station PeNB. The X2 interface communication unit 140 (and the notification generator 184) configures a transmitter to transmit control information in the present embodiment.

The radio resource allocation unit 185 allocates PDCCH and PDSCH with respect to each radio terminal PUE connecting with the picocell base station PeNB for each subframe according to the determined allocation conditions (in other words, the limitation target subframe, the upper limit value of the PDCCH usage in the limitation target subframe, and the on/off of the linked-control of the PDSCH usage in the limitation target subframe). The radio resource allocation unit 185 controls the radio communication unit 110 so that the radio terminal PUE is notified of the allocation information for one subframe by using a PDCCH of a subframe immediately before the one subframe.

The radio resource allocation unit 185 preferentially allocates the PDCCH and PDSCH to the radio terminal PUE in the cell edge of the picocell base station PeNB in the limitation target subframe of the macrocell base station MeNB.

The transmission power controller 186 controls the downlink transmission power of PDCCH and/or PDSCH for each radio terminal PUE connecting with the picocell base station PeNB according to the determined downlink transmission power conditions (in other words, the limitation target subframe, the upper limit value of the PDCCH usage in the limitation target subframe, the RNTP threshold, and the on/off of the linked-control of the PDSCH usage in the limitation target subframe).

When the linked-control of the PDSCH link is on, the transmission power controller 186 limits the downlink transmission power to the RNTP threshold or below for all the RBs in the data region in the limitation target subframe. Also, when the linked-control of the PDSCH link is on, the transmission power controller 186 limits the downlink transmission power to the RNTP threshold or below for only part of the RBs in the data region in the non-limitation target subframe of the picocell base station PeNB.

On the other hand, when the linked-control of the PDSCH link is off, the transmission power controller 186 limits the downlink transmission power to the RNTP threshold or below for only part of the RBs in the data region in each of the limitation target subframe and the non-limitation target subframe of the picocell base station PeNB.

(2.3) Operational Example of Radio Communication System

Figure 22:
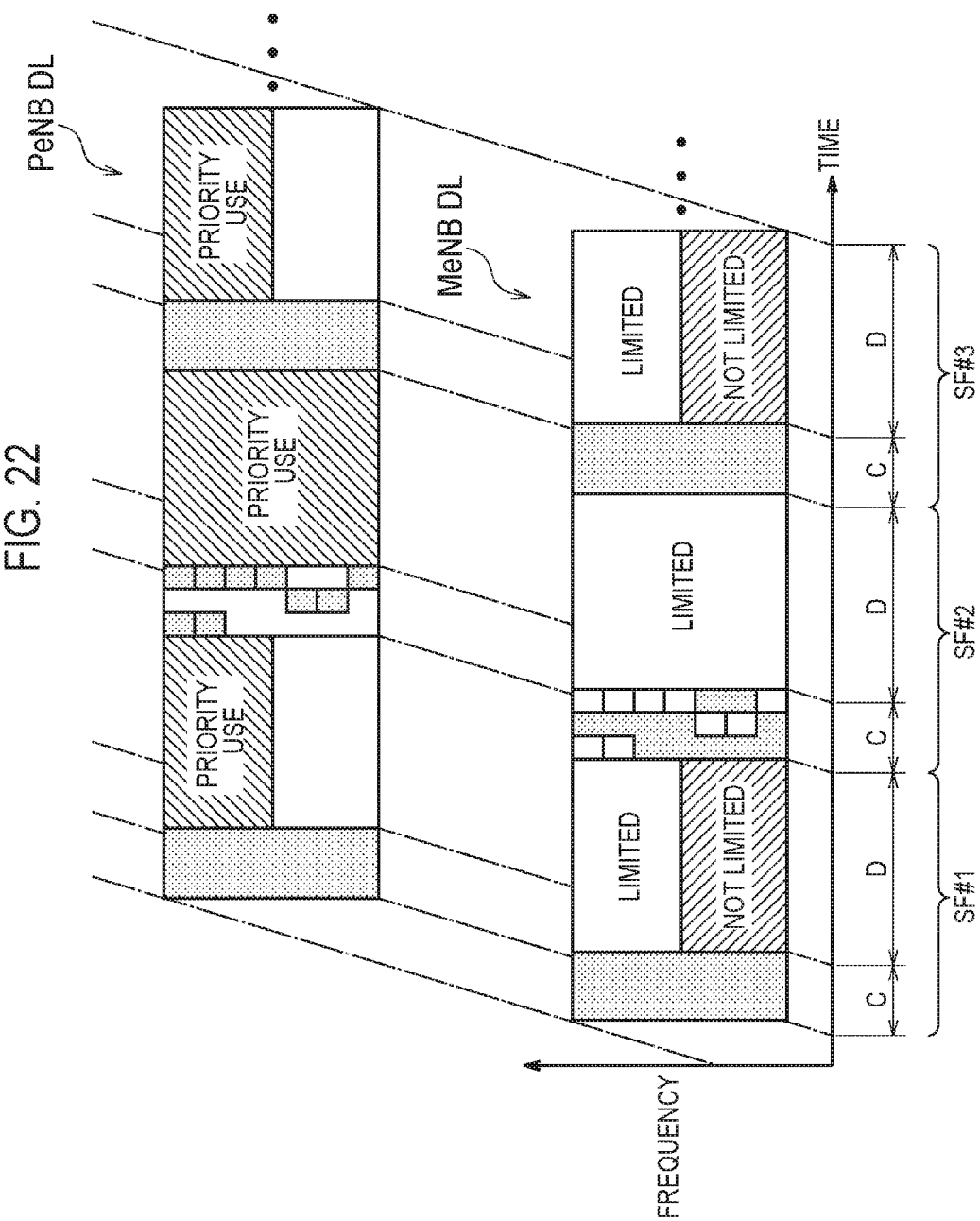
FIG. 22 is a drawing for illustrating an operational example of the radio communication system according to the seventh embodiment.

FIG. 22 is a drawing for illustrating an operational example of the radio communication system according to the seventh embodiment.

As shown in FIG. 22, each of subframes SF#1 to SF#3 arranged in the time direction is divided into a control region C and a data region D.

The macrocell base station MeNB determines the subframe SF#2 as a limitation target subframe of the macrocell base station MeNB, determines the subframes SF#1 and SF#3 as non-limitation target subframes, and determines to make the linked-control of the PDSCH in the limitation target subframe. In the control target subframe SF#2 of the macrocell base station MeNB, part of the control region is blank. Also, the macrocell base station MeNB determines to limit the downlink transmission power to the RNTP threshold or below for each RB on the high-frequency side of the data region D in each of the subframes SF#1 and SE#3, and determines to limit the downlink transmission power to the RNTP threshold or below for all the RBs in the data region of the subframe SF#2. The determination contents made by the macrocell base station MeNB are notified in advance to the picocell base station PeNB through the notification message.

The picocell base station PeNB knows the determination contents made by the macrocell base station MeNB through the notification message from the macrocell base station MeNB. The picocell base station PeNB determines that each RB on the high-frequency side of the data region receives a small interference from the macrocell base station MeNB in the subframes SF#1 and SF#3 and preferentially allocates this RB to the radio terminal PUE. However, the subframes SF#1 and SF#3 may receive a large interference from the macrocell base station MeNB in the control region.

Also, the picocell base station PeNB determines that each of the control region and the data region of the subframe SF#2 receives a small interference from the macrocell base station MeNB and preferentially allocates a radio terminal PUE (in particular a radio terminal PUE in the cell edge) in the control region and the data region of the subframe SF#2. The subframe SF#2 has a low possibility of receiving the interference from the macrocell base station MeNB in the control region and has a preferred PDCCH state even in the radio terminal PUE in the cell edge, so that the radio terminal PUE in the cell edge can preferably receive the control information from the picocell base station PeNB. Also, the subframe SF#2 has a low possibility of receiving the interference from the macrocell base station MeNB even in the data region, so that the radio terminal PUE in the cell edge can preferably receive user data from the picocell base station PeNB.

As described above, in the seventh embodiment, when the downlink transmission power is limited to the RNTP threshold or below for all the RBs in the data region in the limitation target subframe of the macrocell base station MeNB, the macrocell base station MeNB transmits the transmission power information indicating that the downlink transmission power is limited to the RNTP threshold or below for all the RBs in the data region of the limitation target subframe to the picocell base station PeNB through the inter-base station communication. Accordingly, the picocell base station PeNB can know that the interference to be received by the PDSCH of the picocell base station PeNB is small in the limitation target subframe of the macrocell base station MeNB, so that the PDSCH can be effectively allocated.

Note that although the seventh embodiment describes the configuration capable of determining whether to make the linked-control of the PDSCH, but may have a configuration in which the linked-control of the PDSCH is always on in a limitation target subframe, in other words, the transmission power is limited by the RNTP threshold in the limitation target subframe. In this case, the PDSCH linked-control determination units 283, 183 are unnecessary.

Also, in another employable method, an RNTP threshold to be notified is set to be 0 dB to indicate that "the linked-control of the PDSCH is off" and an RNTP threshold to be notified is set to be other than 0 dB to indicate that "the linked-control of the PDSCH is on."

Other Embodiments

As described above, the present disclosure has been described by using the above-described embodiments. However, it should not be understood that the description and the drawings, which constitute part of this disclosure, are to limit the present disclosure. Various alternative embodiments, examples, and operational techniques will be obvious for those who are in the art from this disclosure.

For example, each of the above-described first to seventh embodiments may be implemented as an independent embodiment but also as a combined embodiment.

The above-described embodiment describes the example in which as the PDCCH usage, the number of OFDM symbols in the time axis direction which is capable of being used as PDCCH in a downlink subframe (in other words, the number of OFDM symbols in the time axis direction in the control region) is designated in a range of 1 to 3 (or 1 to 4), or the example in which a usage rate being a ratio of occupying a used PDCCH resource to the entire PDCCH domain (the control region) in one subframe is designated. However, not limited to these designation methods, such method can be designated that the total number of recourses capable of being used as a PDCCH in a downlink subframe is designated by the number of OFDM symbols (in other words, the total number of OFDM symbols in the control region).

Although each of the above-described embodiments describes the case where the interference is suppressed by controlling the PDCCH usage, but such method may be used that the interference is suppressed by controlling not only the PDCCH usage but also PDCCH transmission power. The PDCCH transmission power is transmission power in the entire PDCCH domain (the control region) in one subframe, in which, for example, transmission power for each resource element which is a resource minimum unit is averaged by the entire PDCCH domain (the control region). The PDCCH interference between the base stations can be suppressed even when "PDCCH usage" in each of the above-described embodiments is read as "PDCCH transmission power."

The first, third, fourth, fifth, sixth, and seventh embodiments describe the technique of reducing the inter-base station PDCCH interference between the macrocell base station and the picocell base station, and the second embodiment describes the technique of reducing the inter-base station PDCCH interference between the macrocell base stations. However, the present disclosure is not limited to these combinations of base stations, and can be applied to the reduction of the inter-base station PDCCH interference between any base stations.

Also, it is anticipated in the LTE Advanced that a relay node being a radio base station having a radio backhaul configuration is employed and an X2 interface is also employed for the relay node. Thus, the relay node may be a radio base station according to the present disclosure.

Furthermore, the above-described embodiments describe the LTE system, but the present disclosure may be applied to another radio communication system such as a radio communication system based on WiMAX (IEEE 802.16).

As described above, it should be understood that the present disclosure includes various embodiments not described herein. Accordingly, the present disclosure is only limited by the scope of claims and matters specifying the disclosure, which are appropriate from this disclosure.

Note that the contents of Japanese Patent Application Publications No. 2010-87686 (filed on Apr. 6, 2010), No. 2010-138802 (filed on Jun. 17, 2010), No. 2010-181165 (filed on Aug. 12, 2010), and No. 2010-225266 (filed on Oct. 4, 2010) are hereby incorporated by reference in their entirety.

INDUSTRIAL APPLICABILITY

As described above, a radio communication system, a radio base station, and a communication control method according to the disclosure can reduce an inter-base station interference between downlink control channels, and therefore are useful in radio communications such as a mobile communication.

The invention claimed is:

1. A first radio base station comprising a controller including a processor configured to:
   perform a downlink communication using a radio frame configuration comprising a plurality of subframes arranged in a time direction, wherein each of the plurality of subframes comprises a plurality of resource blocks arranged in a frequency direction;
   receive, from a second radio base station which is receiving an interference caused by the first radio base station, via an X2 interface, a request for transmission of a control information message including a bit string comprising a plurality of bits corresponding to the plurality of subframes, wherein each bit position of the plurality of bits represents a different subframe number; and
   in response to receiving the request from the second radio base station, transmit, to the second radio base station via the X2 interface, the control information message including the bit string comprising the plurality of bits, wherein the plurality of bits comprise:
      "1" bit that indicates a restricted subframe in which the first radio base station restricts a downlink transmission power below a predetermined value, among the plurality of subframes; and
      "0" bit that indicates a non-restricted subframe in which the first radio base station does not restrict a downlink transmission power below the predetermined value, among the plurality of subframes,
   wherein a coverage of the second radio base station is extended by connecting a radio terminal to the second radio base station even when strongest detected cell of the radio terminal belongs to the first radio base station, and
   the restricted subframe enables the radio terminal to be served by the second radio base station even while under the interference from the first radio base station.

2. The first radio base station according to claim 1, wherein the second radio base station determines that the strongest detected cell of the radio terminal belongs to the first radio base station on the basis of reception quality information and channel quality information received from the radio terminal.

3. A second radio base station comprising a controller including a processor configured to:
   transmit, to a first radio base station which is causing an interference to the second radio base station, via an X2 interface, a request for transmission of a control information message including a bit string; and
   in response to transmitting the request to the first radio base station, receive the control information message including the bit string from the first radio base station via the X2 interface, wherein the first radio base station performs a downlink communication using a radio frame configuration comprising a plurality of subframes arranged in a time direction, wherein each of the plurality of subframes comprises a plurality of resource blocks arranged in a frequency direction, the bit string comprises a plurality of bits corresponding to the plurality of subframes, each bit position of the plurality of bits represents a different subframe number, and the plurality of bits comprise:

"1" bit that indicates a restricted subframe in which the first radio base station restricts a downlink transmission power below a predetermined value, among the plurality of subframes; and "0" bit that indicates a non-restricted subframe in which the first radio base station does not restrict a downlink transmission power below the predetermined value, among the plurality of subframes, wherein a coverage of the second radio base station is extended by connecting a radio terminal to the second radio base station even when strongest detected cell of the radio terminal belongs to the first radio base station, and the restricted subframe enables the radio terminal to be served by the second radio base station even while under the interference from the first radio base station.

4. The second radio base station according to claim 3, wherein the controller determines that the strongest detected cell of the radio terminal belongs to the first radio base station on the basis of reception quality information and channel quality information received from the radio terminal.

5. A communication control method used in a radio communication system, the communication control method comprising:

performing, at a first radio base station, a downlink communication using a radio frame configuration comprising a plurality of subframes arranged in a time direction, wherein each of the plurality of subframes comprises a plurality of resource blocks arranged in a frequency direction;

transmitting, from a second radio base station which is receiving an interference caused by the first radio base station, to the first radio base station via an X2 interface, a request for transmission of a control information message including a bit string corresponding to the plurality of subframes;

receiving, at the first radio base station, the request from the second radio base station;

in response to receiving the request from the second radio base station, transmitting, from the first radio base station to the second radio base station via the X2 interface, the control information message including the bit string comprising the plurality of bits, wherein each bit position of the plurality of bits represents a different subframe number, and wherein the plurality of bits comprise "1" bit that indicates a restricted subframe in which the first radio base station restricts a downlink transmission power below a predetermined value, among the plurality of subframes, and "0" bit that indicates a non-restricted subframe in which the first radio base station does not restrict a downlink transmission power below the predetermined value, among the plurality of subframes; and receiving, at the second radio base station, the bit string from the first radio base station via the X2 interface, wherein a coverage of the second radio base station is extended by connecting a radio terminal to the second radio base station even when strongest detected cell of the radio terminal belongs to the first radio base station, and the restricted subframe enables the radio terminal to be served by the second radio base station even while under the interference from the first radio base station.

6. The communication control method according to claim 5, wherein the second radio base station determines that the strongest detected cell of the radio terminal belongs to the first radio base station on the basis of reception quality information and channel quality information received from the radio terminal.

* * * * *